US011971999B2

(12) United States Patent
Winarski

(10) Patent No.: US 11,971,999 B2
(45) Date of Patent: Apr. 30, 2024

(54) OPTIMIZING BLOCKCHAIN CREATION WITH ARTIFICIAL INTELLIGENCE BASED ON SYSTEM RESOURCES

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 471 days.

(21) Appl. No.: 17/242,785

(22) Filed: Apr. 28, 2021

(65) Prior Publication Data

US 2022/0121757 A1    Apr. 21, 2022

Related U.S. Application Data

(60) Provisional application No. 63/094,003, filed on Oct. 20, 2020.

(51) Int. Cl.
*G06F 21/60* (2013.01)
*G06F 9/50* (2006.01)
*G06F 16/23* (2019.01)
*G06F 30/20* (2020.01)

(52) U.S. Cl.
CPC .......... *G06F 21/602* (2013.01); *G06F 9/5005* (2013.01); *G06F 16/2315* (2019.01); *G06F 30/20* (2020.01)

(58) Field of Classification Search
CPC .. G06F 21/602; G06F 9/5005; G06F 16/2315; G06F 30/20; G06F 2209/508; G06F 9/5072; G06F 21/64; H04L 9/3297; H04L 9/50
See application file for complete search history.

(56) References Cited

U.S. PATENT DOCUMENTS

2020/0150994 A1\* 5/2020 Thompson ............ H04L 9/0643
2020/0242602 A1\* 7/2020 Jiang .................... G06Q 20/389

\* cited by examiner

*Primary Examiner* — Trong H Nguyen
(74) *Attorney, Agent, or Firm* — The Winarski Firm, PLLC

(57) ABSTRACT

The present specification discloses a computer tangible medium containing instructions to regulate creation and distribution of blockchain blocks based upon system utilization. The method includes determining utilization of a computer resource and creating a virtual blockchain block based on a data object when utilization exceeds a first threshold. The virtual blockchain block includes file metadata on the data object, but does not include blockchain cryptographic information. The method includes creating a real blockchain block based on the data object when utilization does not exceed the first threshold. The virtual blockchain block is converted to the real blockchain block when utilization drops below the first threshold.

20 Claims, 15 Drawing Sheets

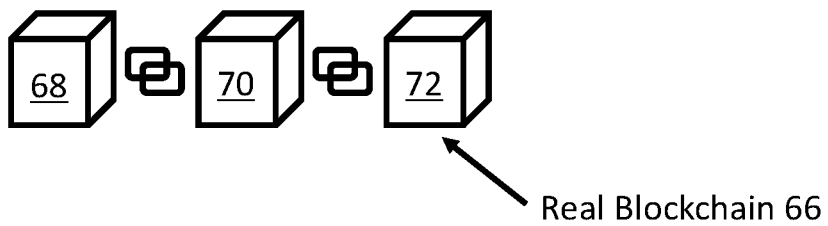

Real Blockchain 66

| REAL BLOCKCHAIN BLOCK 68 | INFORMATION IN BLOCK:<br>*Header<br>*Blockchain Data: TAXES1.XLSX<br>*Hash digest of prior blockchain block (not shown) and hash digest of current blockchain block 68 |
|---|---|

| REAL BLOCKCHAIN BLOCK 70 | INFORMATION IN BLOCK:<br>*Header<br>*Blockchain Data: TAXES2.XLSX<br>*Hash digest of prior blockchain block 68 and hash digest of current blockchain block 70 |
|---|---|

| REAL BLOCKCHAIN BLOCK 72 | INFORMATION IN BLOCK:<br>*Header<br>*Blockchain Data: TAXES3.XLSX<br>*Hash digest of prior blockchain block 70 and hash digest of current blockchain block 72 |
|---|---|

FIG. 11

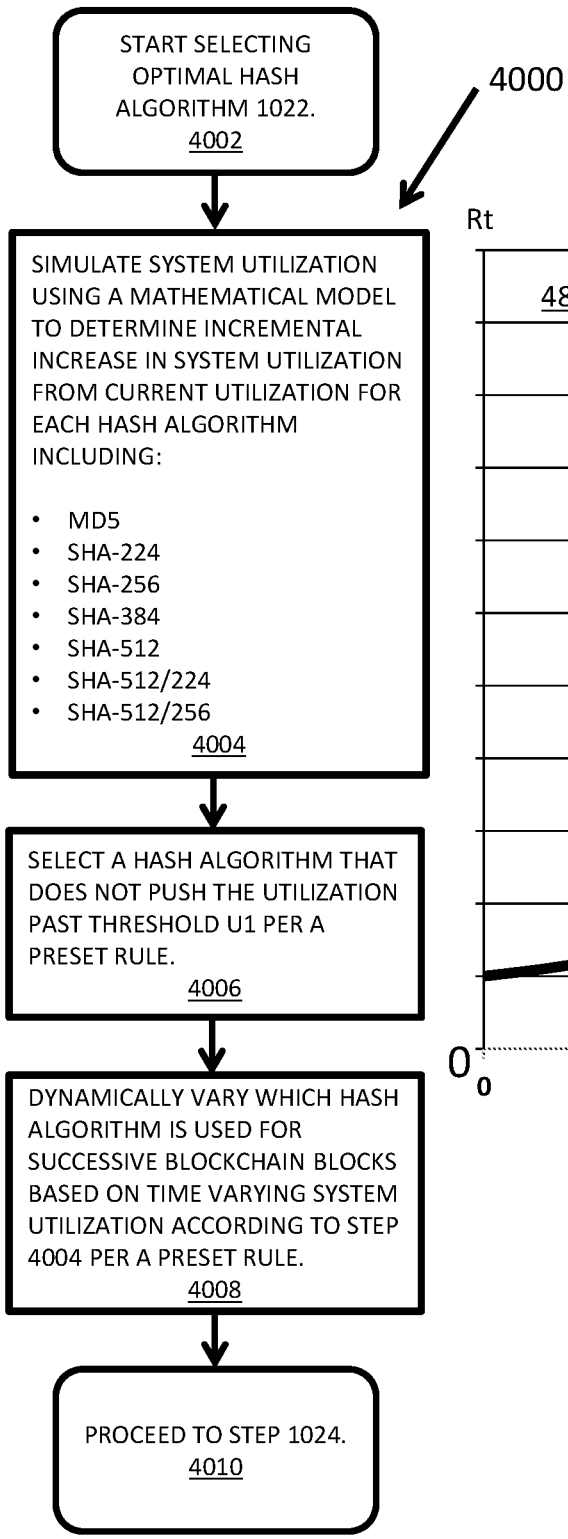
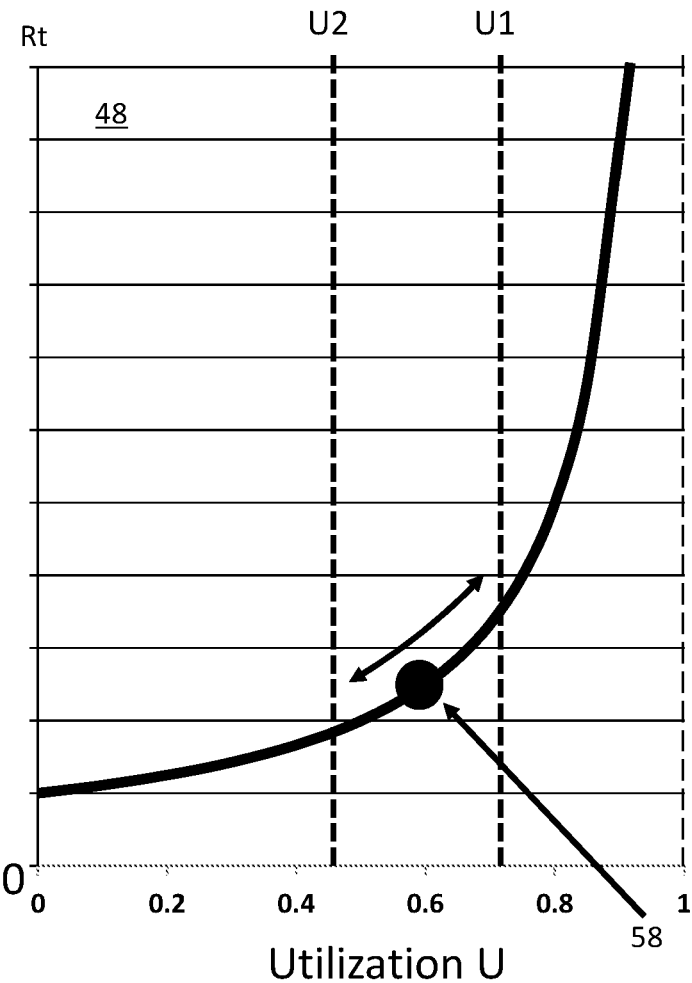
FIG. 12

OPTIMIZING BLOCKCHAIN CREATION WITH ARTIFICIAL INTELLIGENCE BASED ON SYSTEM RESOURCES

FIELD OF THE INVENTION

The present disclosure relates to the field of regulating blockchain creation and distribution based on system resource utilization.

BACKGROUND

A blockchain is a continuously growing list of records, called blocks, which are linked and secured using cryptography. Each block typically contains a cryptographic hash of the previous block and itself, a timestamp, and transaction data. By design, a blockchain is inherently resistant to modification of the data. It is an open, distributed ledger that can record transactions between two parties efficiently and in a verifiable and secure way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Blockchains are secure by design and are an example of a distributed computing system with high Byzantine fault tolerance. Decentralized consensus has therefore, been achieved with a blockchain. This makes blockchains potentially suitable for the recording of events, medical records, and other records management activities, such as identity management, transaction processing, documenting provenance, food traceability, or voting. The first work on a cryptographically secured chain of blocks was described in 1991 by Stuart Haber and W. Scott Stornetta. In 1992, Bayer, Haber, and Stornetta incorporated Merkle trees to the design, which improved its efficiency by allowing several documents to be collected into one block.

SUMMARY

Blockchains provide a secure method for securing data and files in a tamper resistant file storage system. It is desirable to incorporate the use of tamper resistant blockchains with stored files and digital records to secure their file integrity. The creation and distribution of blockchain records can be a system resource intensive process consuming the processing power, bandwidth, and storage capacity of networks, computers, routers, servers, storage systems, and the communications links interconnecting them. The present specification discloses a system and method for regulating the creation and distribution of blockchain records intelligently based upon the availability of computer and network system resources. This regulation of the creation and distribution of blockchain records allows for the ability to manage the process of blockchaining in a way as not to overwhelm computer and network system resources and cause system response time to become unacceptably long.

The present specification discloses a computer tangible medium containing instructions to regulate creation and distribution of blockchain blocks based upon system utilization. The method includes determining utilization of a computer resource and creating a virtual blockchain block based on a data object when utilization exceeds a first threshold. The virtual blockchain block includes file metadata on the data object, but does not include blockchain cryptographic information. The method includes creating a real blockchain block based on the data object when utilization does not exceed the first threshold. The virtual blockchain block is converted to the real blockchain block when utilization drops below the first threshold. The real blockchain blocks are created at a metered rate that does not cause the utilization to exceed the first threshold. The utilization is monitored in real time by a system utilization computer application, or is simulated based upon a numerical model of the system utilization, or a formula that models the utilization. The real blockchain block is created according to a preset rule based on a data object parameter, or a blockchain parameter. The data object parameter is a size of the data object, a type of data object, or data object metadata, where the blockchain parameter is a type of hash digest algorithm. The real blockchain blocks are created at an unrestricted rate when the utilization is below a preset threshold, where real blockchain blocks are created at a restricted rate when the utilization is above the preset threshold. The restricted rate is determined based upon real time monitoring of the system utilization, a numerical model of the system utilization, or a formula that models the system utilization. The real blockchain blocks are distributed to nodes of a distributed network when system utilization is below a preset threshold, or where real blockchain blocks are distributed to nodes of a distributed network at a restricted rate when system utilization is below the preset threshold. Real blockchain blocks are not distributed to nodes of the distributed network when system utilization is above the preset threshold. The blockchain cryptographic information is a blockchain hash digest and the real blockchain block includes a blockchain hash digest. A selection of hash algorithm is varied when creating the real blockchain block to maintain system utilization below a preset threshold.

The present specification discloses a computer tangible medium containing instructions to regulate creation and distribution of blockchain blocks based upon system utilization. The method includes creating blockchain blocks based on a data object that includes blockchain hash digests when utilization of a system resource is below a preset threshold and creating virtual blockchain blocks based on the data object and do not include blockchain hash digests when utilization of a system resource is above the preset threshold. The network resource is a CPU, memory, or network bandwidth. Converting the virtual blockchain blocks to blockchain blocks with blockchain hash digests when utilization of the system resource falls below the preset threshold. The method also includes distributing the blockchain blocks onto nodes of a storage network when system utilization is below the preset threshold, or distributing the blockchain blocks onto nodes of the storage network at a restricted rate when system utilization is below the preset threshold. The blockchain blocks are not distributed onto nodes of the storage network when system utilization exceeds the preset threshold. The blockchain blocks are created at an unrestricted rate when system utilization is below a second preset threshold. The blockchain blocks are created at a metered rate based upon a data object parameter or a blockchain parameter when the system utilization is below the preset threshold.

The present specification also discloses a computer tangible medium containing instructions to create and regulate distribution of blockchain blocks based upon system utilization. The method includes creating real blockchain blocks based on a data object that include blockchain hash digests when utilization of a system resource is below a preset threshold and converting virtual blockchain blocks to real blockchain blocks when utilization of a system resource transitions to being below the preset threshold. The virtual blockchain blocks are based on the data object and do not include blockchain hash digests when utilization of a system resource is above the preset threshold. The virtual blockchain blocks are created when the utilization of the system resource exceeds the preset threshold. The system resource is a CPU, memory, or network bandwidth. The method includes distributing the blockchain blocks onto nodes of a storage network when network utilization is below the preset threshold, or distributing the blockchain blocks onto nodes of the storage network at a restricted rate when network utilization is below the preset threshold. The blockchain blocks are not distributed onto nodes of the storage network when network utilization exceeds the preset threshold. The network utilization is monitored in real time by a utilization computer application, or is simulated based upon a numerical model of the network utilization or a formula that models the network utilization.

Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 11 illustrates a real blockchain formed of a series of blockchain blocks along with the data contained within each of the blockchain blocks;

FIG. 12 illustrates a flowchart depicting a process for dynamically varying the selection of hash algorithm used to generate blockchain blocks in order to maintain computer network resource utilization below a preset threshold as illustrated on a network computer resource utilization diagram where system utilization is plotted against system response time;

DETAILED DESCRIPTION

Figure 1:
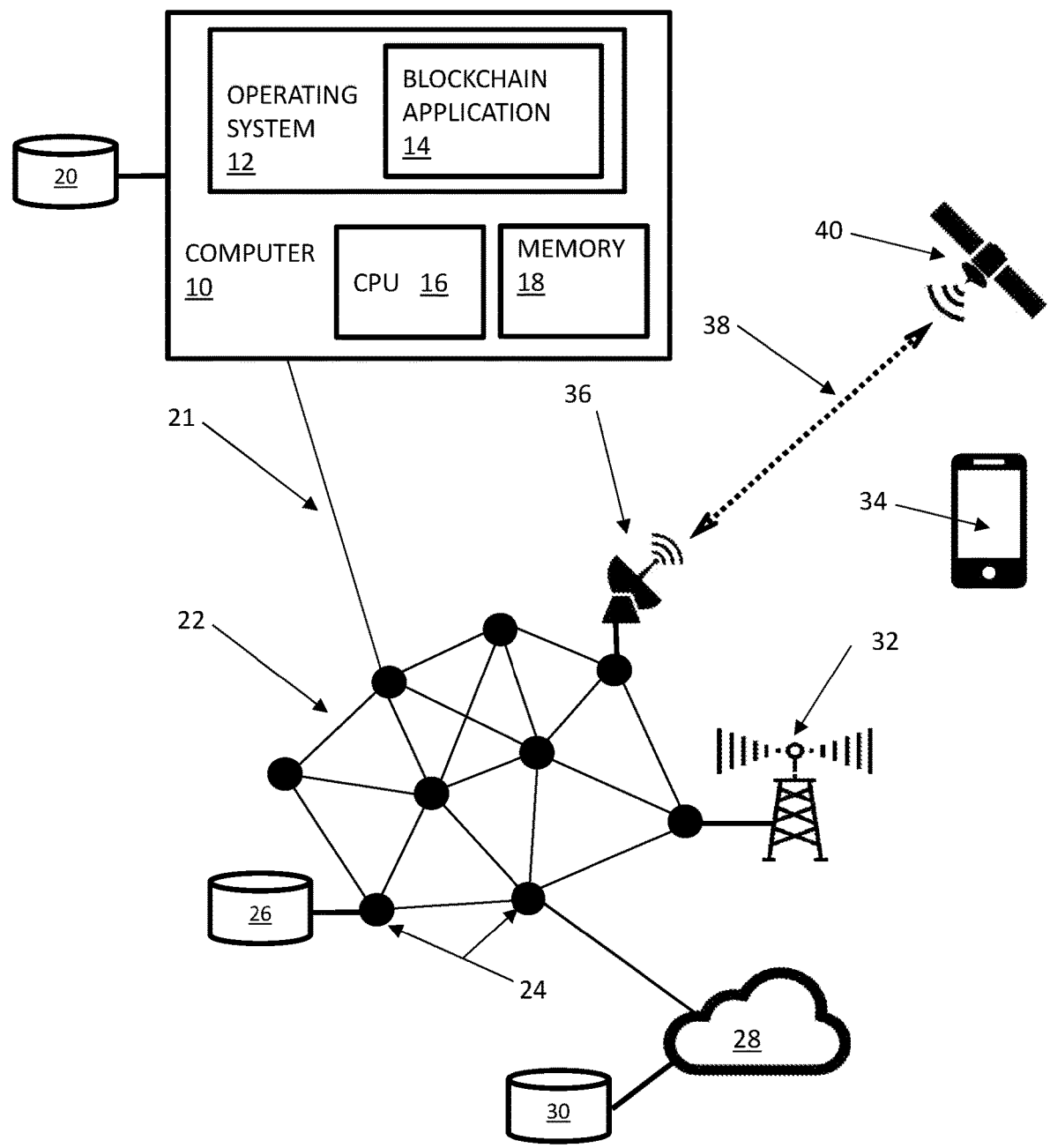
FIG. 1 depicts a block diagram of a computer system in a network environment with cloud, wireless, and satellite connectivity which are the network computer system resources that are monitored for utilization for regulating the creation and distribution of blockchain blocks.

While the invention has been shown and described with reference to a particular embodiment thereof, it will be understood to those skilled in the art, that various changes in form and details may be made therein without departing from the spirit and scope of the invention.

The present specification is directed to regulating blockchain creation and distribution based on computer and network utilization. The fast and efficient creation and distribution of blockchains is dependent upon maintaining high performance by computer systems and connected networks. Computer and network system performance is a parameter that is dependent upon available Central Processing Unit (CPU) processing ability, bandwidth of communication links interconnecting the computer with network resources, and storage capacity and response time of memory resources. Computer and network system performance is a parameter that varies depending upon the amount and type of work demanded of the constituent technological components of the computer and network system. For high performance of a computer system and connected network, which is collectively a system, it is desirable to have a short response time for a given piece of data work, a high rate of processing the work, a low utilization of computer system and network resources, a high availability of the computing operating system and needed software applications, and a high bandwidth of data transmission lines to allow for short data transmission time. For high performance, the response time of computing and network system resources varies directly with the utilization of those resources. Response time is the total amount of time it takes for a computer, network, or component thereof to respond to a request for service. That service can be anything from a memory fetch, to a disk 10, to a complex database query, or loading a full web page for example. Utilization refers to the usage of computing and network resources for performing tasks. When the work demanded of computing and network resources remains within a low utilization range, the response time of those computing and network system resources shows little variance. However, as utilization of the computing and network resources increases, response time will correspondingly decrease. Eventually, there comes a point where incremental increases in utilization causes sharp increases in response time resulting in a dramatic decrease in computer and network system performance. It is possible to maintain high performance of computer and network system resources by regulating the type and amount of work done by their constituent components to maintain fast response time. Generating blockchain blocks is work for computer and network system resources that impacts utilization. The determination of blockchain hash digests based upon constituent data is work that can be intensive for constituent computing resources such as CPUs or dedicated hash processors. The creation of too many blockchain hash digests too fast or too large of data objects can cause high system utilization that will cause sharp increases in response time and decreases in performance. The distribution of blockchain blocks onto nodes of a distributed network for storage is work that can be intensive for computer and network system resources such as servers, routers, bandwidth of transmission links, and memory storage systems. The distribution of too many blockchain blocks for storage too fast can cause high utilization that can overwhelm servers, available transmission link bandwidth, and memory storage capacity that can cause sharp increases in response time degrading computer and network performance. Degradation of computer and network performance hinders the ability to create and distribute blockchain blocks. The present specification discloses a system and method for regulating the creation and distribution of blockchain blocks on a computer system and connected network system in order to keep utilization and response time of computer and network system resources within desired ranges to maintain performance within desired levels.

FIG. 1 depicts a block diagram of a computer system 10 in a network environment 22 with cloud 28, wireless 32, and satellite 40 connectivity, which together with all other components shown in FIG. 1 are the network computer system resources that are monitored for utilization for regulating the creation and distribution of blockchain blocks in order to maintain overall system performance. Blockchain blocks are created by computer system 10. Computer system 10 includes an operating system 12. Operating system 12 is software that runs applications such as blockchain application 14. Blockchain application 14 is a software application that creates blockchain blocks based upon data objects using various hash algorithms to create blockchain hash digests that form blockchain blocks together with the associated data object. The hash algorithms are generated by Central Processing Unit (CPU) 16. Computer 10 may also include dedicated hash digest generating processors (not shown). Computer 10 may also include memory 18 to store the software for operating system 12 and blockchain application 14. Memory 18 may also store the data objects upon which the blockchain blocks are generated. Memory 18 may also store the blockchain hash digests generated by CPU 16 along with any other blockchain information such as blockchain metadata, blockchain ledgers, and blockchain block storage locations and maps. Memory 18 may be cache, a Hard-Disk Drive (HDD), a Solid-State Drive (SSD), or any form of magnetic, solid state, or optical memory. Computer 10 may be bidirectionally coupled to external memory 20, which may be cache, a Hard-Disk Drive (HDD), a Solid-State Drive (SSD), or any form of magnetic, solid state, or optical memory. External memory 20 may store the data objects that form the basis for the blockchain blocks, or store any blockchain information such as hash digests, blockchain ledgers, blockchain metadata, and blockchain storage location information or maps. Computer 10 is bidirectionally linked to a distributed network 22 through communications link 21. Communications link 21 may be any form of communications link that facilitates bidirectional transmission of digital information such as optic fiber, copper wire, or wireless communications link. Distributed network 22 is a peer-to-peer network made up of a plurality of nodes 24. Nodes 24 store redundant copies of blockchain information generated by computer 10. Network 22 may include various servers and routers. Computer 10 creates new blockchain blocks and stores those new blockchain blocks initially in memory 18 and/or external drive 20. Computer 10 then transmits the new blockchain blocks for redundant storage of the blockchain blocks on nodes 24 of network 22. Network 22 may include Network Attached Storage (NAS) 26 that may store blockchain information. NAS 26 may be cache, a Hard-Disk Drive (HDD), a Solid-State Drive (SSD), or any form of magnetic, solid state, or optical memory. Distributed network 22 may be connected to the cloud 28. Cloud 28 is the internet. Cloud 28 may include cloud storage 30, which may be cache, a Hard-Disk Drive (HDD), a Solid-State Drive (SSD), or any form of magnetic, solid state, or optical memory. Distributed network 22 may include bidirectional wireless communications link 32 that can communicate with a wireless device 34, which may be a cell phone, a tablet, a laptop, or any wireless capable mobile computing device. Distributed network 22 may also include a bidirectional satellite communications link 36 that can send bidirectional digital communications 38 with a satellite 40. Satellite 40 may communicate bidirectionally with cloud 28 or mobile devices 34 like satellite phones or satellite enabled computers. All of the components of computer 10, network 22, storage systems 22, 24, 26, 28, 39, and 34 as well as communication links 21, 32, 38 are computer and network resources that must have their utilization regulated in order to maintain a desired response time and performance level. Blockchain information may be stored on cloud 28 or cloud storage 30. Blockchain information may be transmitted to satellite 40 or mobile device 34.

Figure 2:
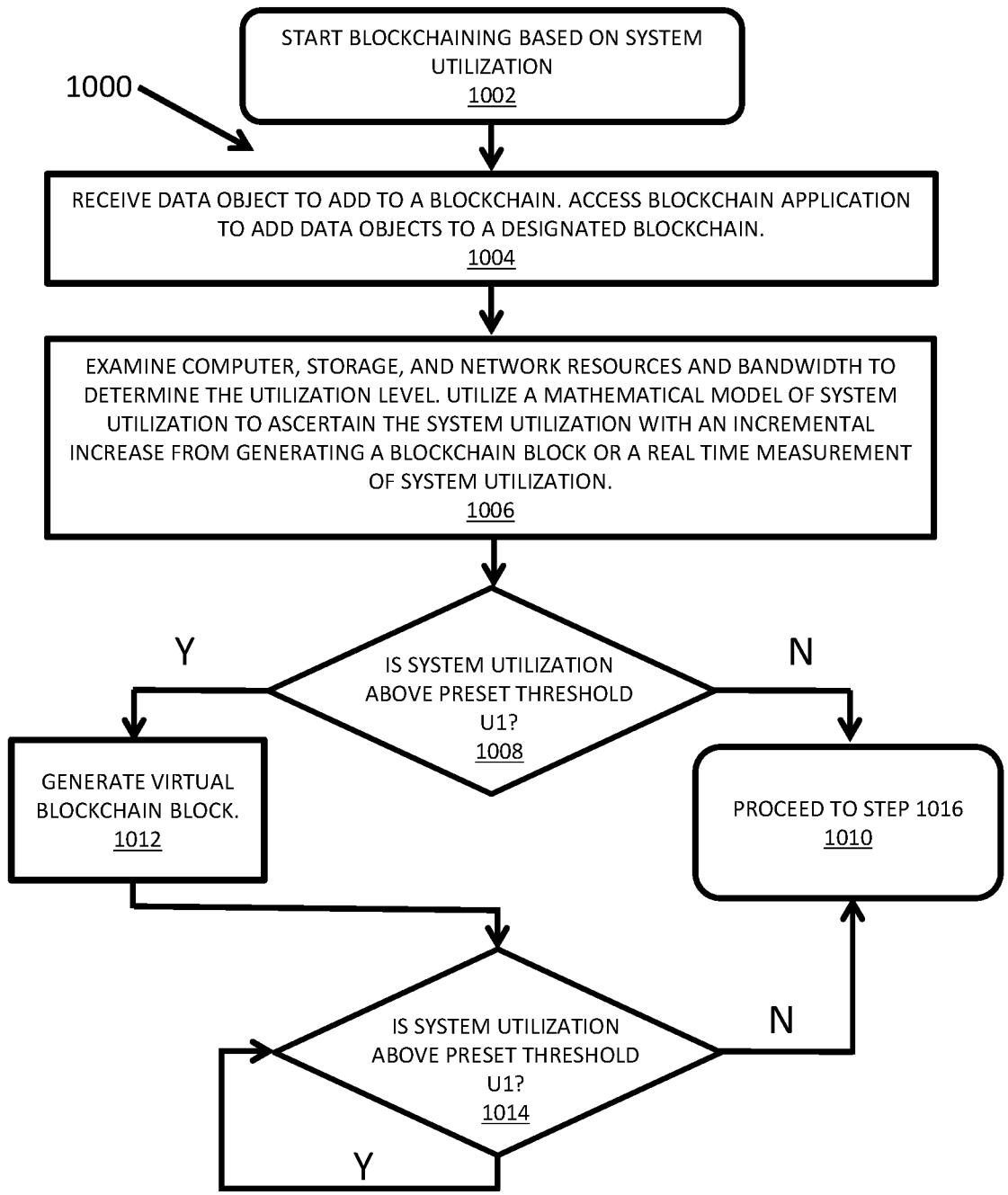
FIGS. 2 and 3 illustrate a flow chart depicting a process for creating and distributing blockchain blocks based upon utilization of network computer resources.
Figure 3:
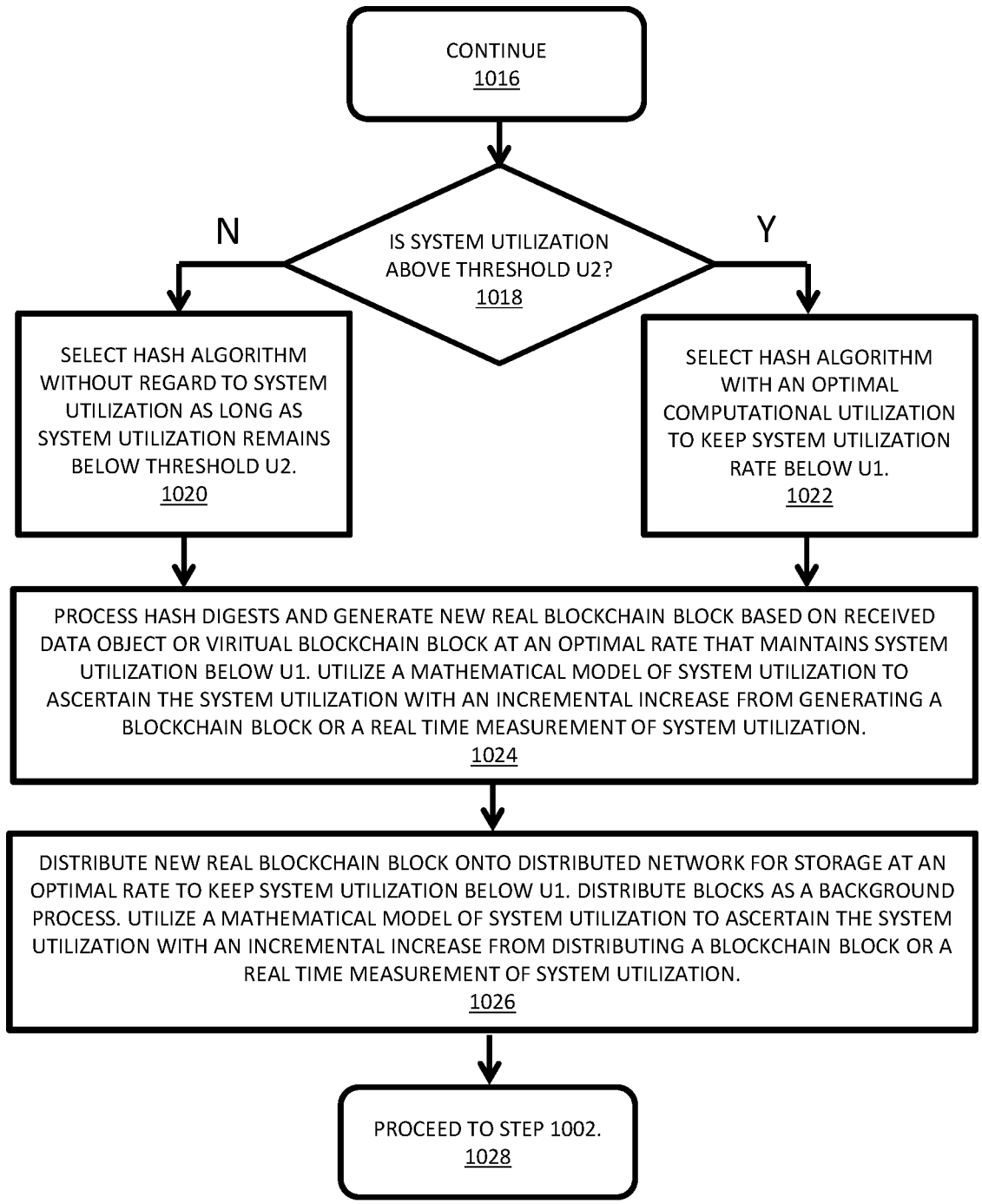

FIGS. 2 and 3 illustrate a flow chart 1000 depicting a process 1000 for creating and distributing blockchain blocks based upon utilization of network computer resources, which were illustrated in FIG. 1. Referring to FIG. 2, the process for blockchaining data based upon system utilization begins with START 1002. In step 1004, computer system 10 receives a data object to add to a blockchain from network 22 or another system. Computer system 10 accesses the blockchain application to add the data object to a designated blockchain. It is contemplated that numerous different blockchains will reside on network 22 and other storage systems and that computer 10 will designate a particular blockchain that the data object will be added to. Specific blockchains are selected and designated through blockchain software application 14. In step 1006, blockchain application 14 examines computer and network resources such as computer 10, CPU 16, storage systems 18, 20, 24, 26, 28, 30, 34, and 40, networks 22 and 28, and bandwidth of communications links 21, 38, and 32 in order to determine their utilization level. The blockchain application 14 then uses a system to determine what incremental increase in system utilization would result from generating one or more blockchain blocks with the blockchain application. The blockchain application may determine this incremental increase through using a mathematical model of the system based upon either an equation, numerical analysis, or real time measurements. The point of performing this step is to ensure that the addition of new blockchain generation work to overall system utilization does not push system utilization past a point where system response time increases sharply, degrading overall system performance. In step 1008, a preset threshold U1 is set on the utilization curve. This preset threshold U1 is a preset point upon the utilization curve past which system response time increases sharply for small increases in system utilization. When computer or network system resources shown in FIG. 1 operate with a utilization past preset threshold U1, small increases in utilization cause sharp increases in response time and sharp degradation in system performance. It is therefore desirable to maintain utilization of computer and network system resources shown in FIG. 1 below preset threshold U1. Preset threshold U1 may be selected based upon desired performance levels. It may be desired to sacrifice performance for the ability to increase utilization and handle more processing work. However, it may be desired to have high performance and limit the utilization. Thus, U1 may be a user selected threshold that is preset on a desired performance level. In step 1008, the blockchain application 13 determines whether the system utilization is above preset threshold U1. System utilization refers to all the computer, network, and other system components shown in FIG. 1. If system utilization is above preset threshold U1, the process proceeds to step 1012 and blockchain application 14 generates virtual blockchain blocks instead of generating real blockchain blocks. Virtual blockchain blocks are created instead of real blockchain blocks because they are computationally easier and create less work for the system than generating real blockchain blocks. Virtual blockchain blocks do not include any blockchain hash digest information or blockchain ledger information. Virtual blockchain blocks do contain metadata about the data object that is to be blockchained, but do not contain the actual data object. The lack of blockchain hash digest information or blockchain ledger information makes it computationally easier and faster to create virtual blockchain blocks than real blockchain blocks. Thus, when system utilization is over a critical threshold, virtual blockchain blocks are created in lieu of real blockchain blocks to preserve system response time and performance. The virtual blockchain blocks act as a temporary data holding structure until it is possible to generate real blockchain blocks when the system utilization falls below preset threshold U1. In step 1014, after creation of the virtual blockchain block based upon a data object from step 1004, the system utilization level is continued to be monitored with respect to preset threshold U1. If system utilization is below preset threshold U1 in step 1008, or falls below preset threshold U1 in step 1014, the process proceeds in step 1010 to step 1016. Referring to FIG. 3, the process continues with step 1016. In step 1018, the blockchain application 14 ascertains whether the system utilization is above or below a second preset threshold U2. If system utilization is not above second preset threshold U2, in step 1020, blockchain application 14 selects a hash algorithm to use without regard to system utilization as long as the system utilization remains below preset threshold U2. However, if system utilization is above preset threshold U2, the process proceeds to step 1022 where a hash algorithm is selected with an optimal computational work level that does not push the overall system utilization above preset threshold U1. The computational work required to generate a blockchain hash digest can vary depending upon the hash algorithm used. Example hash algorithms include, but are not limited to, MD5, SHA-224, SHA-256, SHA-384, SHA-512, SHA-512/224, SHA-512/256. MD5 for example, has a computational workload that is less than SHA-512/256. When system utilization is between preset thresholds U2 and U1, blockchain application 14 examines whether it needs to utilize a computationally less intensive hash algorithm to generate hash digests than a preset hash algorithm. For example, if use of hash algorithm SHA-512/256 pushes system utilization past preset threshold U1, blockchain application 14 in step 1022 may elect to use a computationally less intensive hash algorithm like SHA-256 or MD5 in order to continue to generate real blockchain blocks without pushing utilization past preset threshold U1. In step 1024, blockchain application 14 utilizes CPU 16 to process blockchain hash digests based upon the selected data object from step 1004 with the hash algorithm selected from steps 1020 or 1022. Process step 1022 is expanded and examined in more detail in process 4000 shown in FIG. 12. The blockchain application 14 utilizes the generated blockchain hash digests to generate new real blockchain blocks based on the received data object. The blockchain application 14 may also generate the new real blockchain blocks from virtual blockchain blocks created in step 1012. The virtual blockchain blocks are in effect a placeholder that is easy to computationally create when system utilization is above preset threshold U1. When utilization falls below preset threshold U1, in step 1024 blockchain application 14 converts the virtual blockchain blocks into real blockchain blocks by accessing the metadata in the virtual blockchain blocks on the data objects in order to access the data object from memory and generate blockchain hash digests on it in step 1024 using a hash digest selected in steps 1020 or 1022. The real blockchain blocks are generated directly from data objects or from virtual blockchain blocks at an optimal rate so as not to cause utilization to exceed preset threshold U1. This optimal rate is a metered rate in which real blockchain blocks are created at a pace that does not cause system utilization to exceed preset threshold U1. This optimal rate is determined by the blockchain application 14 modeling system utilization using an equation or a numerical model, or by measuring the actual system utilization directly. Incremental changes in utilization are determined for the process of generating blockchain blocks to keep utilization below preset threshold U1. Process step 1024 is expanded and examined in more detail in process 2000 shown in FIG. 5. In process step 1026, blockchain application 14 utilizes communications link 21 in order to distribute the newly created blockchain block onto distributed network 22 for storage on nodes 24 or on cloud 28, or storage devices 26, 30, 34, or 40. Distribution of new real blockchain blocks may be done at an optimal rate, which is a metered rate, so as not to push utilization of resources past preset threshold U1. This optimal rate is determined by the blockchain application 14 modeling system utilization using an equation or a numerical model, or by measuring the actual system utilization directly. Incremental changes in utilization are determined for the process of distributing blockchain blocks to keep utilization below preset threshold U1. Distribution of blockchain blocks is a background process for computer 10. The process then proceeds to step 1028, where it returns to step 1002 in order to restart the process to blockchain a new data object.

Figure 4:
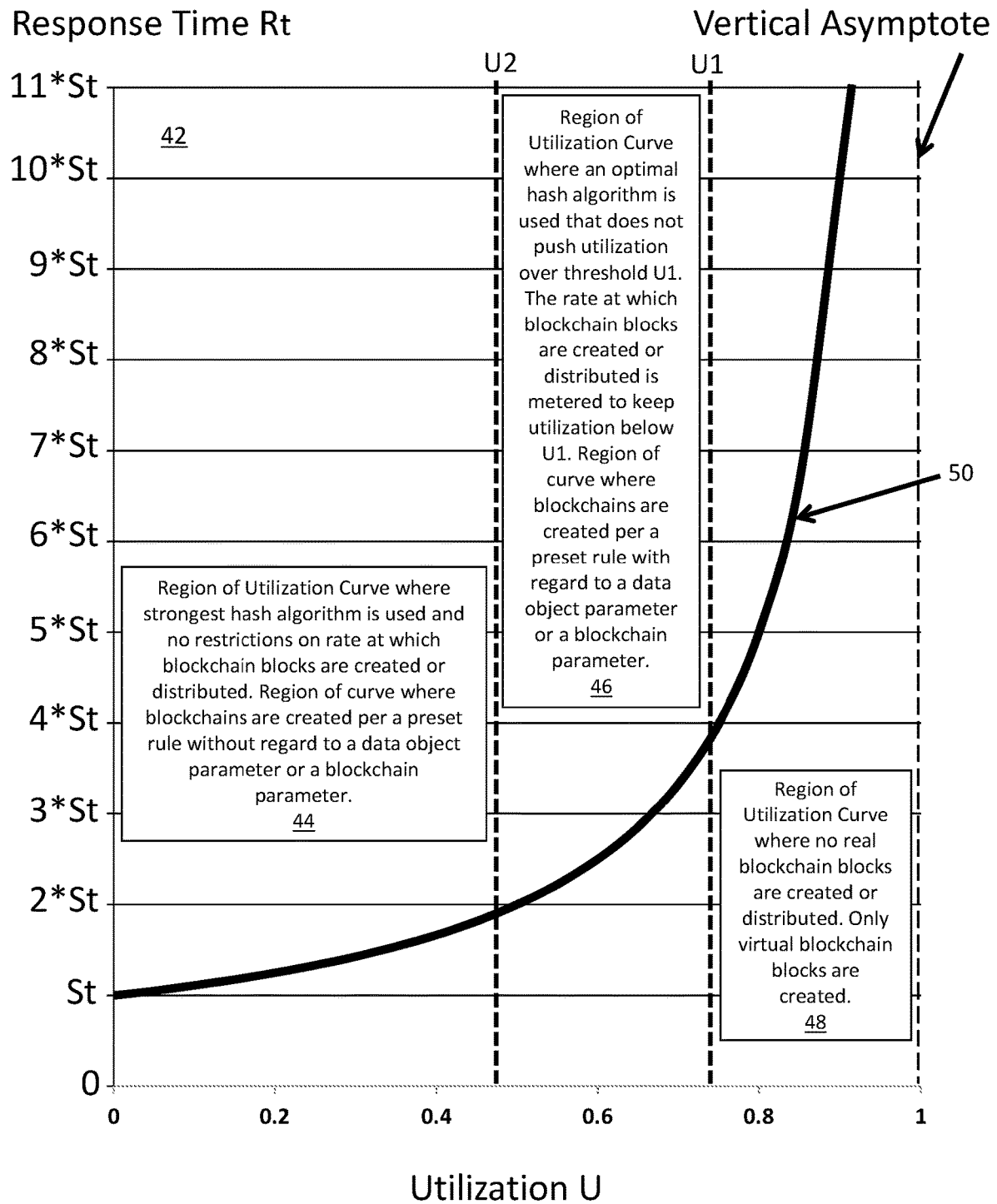
FIG. 4 illustrates a network computer resource utilization diagram where system utilization is plotted against system response time.

FIG. 4 illustrates a network computer resource utilization diagram 42 where system utilization U is plotted against system response time Rt. Resource utilization varies from 0 to 1. Response time Rt varies from 0 to 11 service time (St). Preset threshold U1 is shown being between 0.6 U and 0.8 U. This position for preset threshold U1 is exemplary and the position may be moved to any position on the utilization axis. Preset threshold U2 is shown being between 0.4 U and 0.6 U. This position for preset threshold U2 is exemplary and the position may be moved to any position on the utilization axis. Curve 50 is the curve showing how the response time Rt varies with utilization. As can be seen, utilization varies generally linearly with respect to response time up until about 0.5 U. After about 0.5 U, utilization begins to vary parabolically until about 0.8 U where response time increases sharply as the response time-utilization curve asymptotically approaches 1 U. As can be seen from the graph 42 in FIG. 4, small increases in utilization U past a value of 0.8 U create sharp increases in response time Rt. When utilization is below preset threshold U2, this defines a region of the utilization curve 50 where a strongest hash algorithm may be used or any preset hash algorithm for generating blockchain hash digests as shown by region statement 44 and discussed in process 4000. In addition, when utilization is below preset threshold U2, there are no restrictions on the rate at which blockchain blocks are created or distributed per process 1000, and subprocesses 2000 and 3000. Below preset threshold U2, blockchain blocks are created and distributed per preset rules without regard to parameters of the data objects or parameters of the blockchain. When utilization for a system falls between preset thresholds U2 and U1, this region of the utilization curve is where optimal hash algorithms are selected and used so as not to push utilization past preset threshold U1 per process 4000 as recited in statement 46. When utilization is between preset thresholds U2 and U1, the rate at which blockchain blocks are generated and distributed is metered to keep utilization below preset threshold U1 per process 1000, and subprocesses 2000 and 3000. When utilization is between preset thresholds U1 and U2, blockchains are created and distributed per preset rules that are based upon parameters of the data objects being blockchain or based upon parameters of the blockchain. Parameters of the data object can include any parameter of the data object such as file size, file name, file type, file metadata, or other parameter of the data object. Parameters of the blockchain may include the hash digest algorithm type, types of hash digests such as forward, reverse, hex-reverse, bit-reverse, sector-reverse, or byte-reverse, or other blockchain metadata that may have preferences for certain blockchains over others as designated by a user. For example, accounting blockchains may have preference over user security access blockchains. Above preset threshold U1 is a region of the utilization curve 50 described by statement 48. Above preset threshold U1 is a region of the utilization curve where no real blockchain blocks are created or distributed in order to prevent blockchain application 14 from further negatively impacting system performance by sharply increasing response time with even the smallest of increases in utilization. Above threshold U1, blockchain application 14 generates virtual blockchain blocks only instead of real blockchain blocks as stated per statement 48.

Curve 50 may be a mathematical model that blockchain application 14 uses to simulate incremental differences of utilization and response time based upon projected utilization increases due to proposed processes and actual measured utilization information from the system in FIG. 1. Curve 50 may be based upon the Pollaczek-Khinchine equation that is one way of modeling how the system response time Rt varies with system utilization, U. Utilization U equals the actual workload divided by the maximum workload. For example, if a computer processor can process up to 1000 MIPS (millions of instructions per second), then a workload of 200 MIPS would give a utilization U equaling 0.2 or 20% (200/1000). Similarly, if a telecommunications network can process up to 1000 Gbs (Giga bits per second), then a workload of 200 Gbs would give a utilization U equaling 0.2 or 20% (200/1000). Utilization U is unitless, as the numerator and denominator have the same units, such as MIPS/MIPS for the utilization of a computer processor and Gbs/Gbs for a telecommunications network. Also, U is defined over the range of $0 \leq U \leq 1$, as shown in FIG. 4. The system response time Rt is equal to the sum of the service time St plus the time spent waiting in the queue, Qt, EQUATION 1.

$$Rt = St + Qt \quad \text{(equation 1)}$$

The Pollaczek-Khinchine equation gives the queue time as $St*[U/(1-U)]*[(1+CV^2)/2]$, as shown in EQUATION 2, where CV is the coefficient of variation of service times.

$$Rt = St + St * \left[\frac{U}{1-U}\right] * \left[\frac{1+CV^2}{2}\right] \quad \text{(equation 2)}$$

$CV^2=1$ for a negative-exponentially distributed workload. CV can have its valuation adjusted from 1 to tune the curve for different workloads. Combining terms in EQUATION 2 produces EQUATION 3 shown below.

$$Rt = \frac{St}{1-U} \quad \text{(equation 3)}$$

EQUATION 3 is graphed in FIG. 4 as curve 50, where Response Time, Rt, is the vertical axis versus system utilization U, along the horizontal axis. The Pollaczek-Khinchine EQUATION 3 indicates that as the system utilization U increases, the overall system response time increases, as shown in FIG. 4, due to longer time spent in the queue. When the system utilization is zero, U=0, the system response time Rt is equal to the service time St, meaning that there is no queue time. However, as the system utilization U increases, the system response time increases, slowly for low utilization and sharply for higher utilization. The increase in system response time increases algebraically, based on 1/(1−U), and this is not an exponential increase even though it looks like it. There is a vertical asymptote at U=1 (100%), which means that the queue will become infinitely long, over time, at 100% utilization, U=1.

The Pollaczek-Khinchine equation indicates the value of a system-administrator generated threshold, Ut, for decision making, such as U1 or U2 as shown in FIG. 4. If $U \leq U1$, then it is permissible to calculate the hash digests used in blockchaining, as these require a lot of system MIPS, but the system is lightly loaded. If the system utilization U exceeds the threshold U1, U>U1, then the intensive calculations of the blockchain hash digests are delayed, until evening or weekends, as the system is too busy right now. The Pollaczek-Khinchine EQUATION 3 can be differentiated with respect to utilization U and used to form a Taylor Series to predict how an increase or decrease in system utilization will change the system response time Rt. The Taylor Series can be used to model how the computer system responds to utilization. By using either the equation for differentiating a quotient or by using the chain rule in differential calculus, the first derivative of response time with respect to system utilization is, where 1!=1:

$$\frac{dRt}{dU} = 1! * \frac{St}{(1-U)^2} \quad \text{(equation 4)}$$

The second derivative is, where 2!=2*1:

$$\frac{dRt^2}{dU^2} = 2! * \frac{St}{(1-U)^3} \quad \text{(equation 5)}$$

The third derivative is, where 3!=3*2*1:

$$\frac{dRt^3}{dU^3} = 3! * \frac{St}{(1-U)^4} \quad \text{(equation 6)}$$

In general, the n-th derivative is, where n!=-1)*(n-2) . . . 3*2*1:

$$\frac{dRt^n}{dU^n} = n! * \frac{St}{(1-U)^{n+1}} \quad \text{(equation 7)}$$

These terms will be used in the Taylor Series for Rt(U+ΔU). The Taylor Series for R(U+ΔU) is given by EQUATION 8:

$$Rt(U + \Delta U) = \quad \text{(equation 8)}$$
$$Rt(U) + \frac{\frac{dRt}{dU}}{1!}(\Delta U) + \frac{\frac{dRt^2}{dU^2}}{2!}(\Delta U)^2 + \frac{\frac{dRt^3}{dU^3}}{3!}(\Delta U)^3 \ldots$$

Using EQUATIONS 4-7 in EQUATION 8 produces EQUATION 9. Note how the respective factorial terms are equal in the numerators of EQUATIONS 4-7 and denominators of EQUATION 8, and thus cancel each other in EQUATION 9.

$$Rt(U + \Delta U) = \quad \text{(equation 9)}$$
$$Rt(U) + \frac{St}{(1-U)^2}(\Delta U) + \frac{St}{(1-U)^3}(\Delta U)^2 + \frac{St}{(1-U)^4}(\Delta U)^3 \ldots$$

Factoring the common term St in EQUATION 9 produces EQUATION 10:

$$Rt(U + \Delta U) = \quad \text{(equation 10)}$$
$$Rt(U) + St * \left[ \frac{\Delta U}{(1-U)^2} + \frac{(\Delta U)^2}{(1-U)^3} + \frac{(\Delta U)^3}{(1-U)^4} \ldots \right]$$

With respect to EQUATION 10, if the change in utilization ΔU is greater than zero, ΔU>0, then all power of ΔU are positive and the change in response time increases more as ΔU increases. However, if the change in utilization ΔU is less than zero, ΔU<0, then all even powers of ΔU are positive and all odd powers of ΔU are negative, and these alternating signs reduce the change in response time as ΔU decreases. This is exactly what is visually seen in FIG. 4; however, now EQUATION 1 can be used to predict that change in system response time, ΔRt=Rt(U+ΔU)−Rt(U) as shown in EQUATION 11, as a function of ΔU and the actual system utilization U. The actual system utilization U is typically known, as it is a metric often measured by the system itself. But by knowing what the expected change in system utilization ΔU is, based on the expected demand of additional blockchaining, the change in system response time ΔRt can be calculated to see if additional blockchaining is a viable choice.

$$\Delta Rt = St * \left[ \frac{\Delta U}{(1-U)^2} + \frac{(\Delta U)^2}{(1-U)^3} + \frac{(\Delta U)^3}{(1-U)^4} \ldots \right] \quad \text{(equation 11)}$$

Another use of EQUATION 11 is calculating how much the system response time ΔRt can be reduced by reducing system utilization, with ΔU<0, in case too much blockchaining is being done and the system response time Rt is too high. Another use of EQUATION 11 is calculating how much the system response time ΔRt can be reduced by reducing system utilization, with ΔU<0, in case too much blockchaining is being done and the system response time Rt is too high. EQUATION 11 can be rewritten as EQUATION 12, where the Greek letter sigma denotes summation, and that summation is from 1≤n≤N. In theory, positive integer N may be set to infinity. However, the system administrator may wish to set N to a smaller number, such as N=1 (smallest permissible number) to N=2 or N=3.

$$\Delta Rt = St * \sum \left[ \frac{(\Delta U)^n}{(1-U)^{n+1}} \right] \quad \text{(equation 12)}$$

One practical implementation is to calculate multiple ΔRt estimates from EQUATION 12, in parallel, using various values of N≥1, and then comparing those ΔRt estimates to the actual ΔRt achieved by the change in utilization ΔU. That ΔRt(estimate) versus ΔRt(actual) comparison would help to determine the desired value of N. In EQUATION 13, the absolute value of the difference of ΔRt(estimate) minus ΔRt(actual), so that N could be chosen based on the smallest ΔRt(error).

$$\Delta Rt(\text{error}) = |\Delta Rt(\text{estimate}) - \Delta Rt(\text{actual})| \quad \text{(equation 13)}$$

The original purpose of the Pollaczek-Khinchine equation was to have a differentiable function for the calculation of analytical derivatives of response time Rt versus utilization U. These derivatives were used in a Taylor Series, as previously shown in EQUATION 9, to extrapolate what the response time Rt(U+ΔU) might be when the utilization is increased or decreased by ΔU, due to an increase or decrease of blockchain workload, from the current utilization U. These derivatives presume that the Pollaczek-Khinchine equation, EQUATION 3, is a reasonable analytical approximation of the response time versus utilization. Although the general form of the Pollaczek-Khinchine equation is indeed reasonable, because the modeled queue time is zero at U=0, and queue time goes asymptotically towards infinity when the utilization of the system is at its maximum of 100%.

Equations 1-13 provide mathematical models for utilization and response time for a system as plotted in curve 50. An alternative embodiment to the use of a mathematical model is to have a history of actual system utilization and response time that is used as a model for utilization and response time. This history of system utilization and response time may be kept by operating system 12. One form of this running-operating system history of response time may be in the form of a histogram, where range of utilization U is discretized into equally spaced increments, and any response times measured within one of said increments is stored therein. With a running-operating system history, a time limit "T" may be set by the system administrator so that response time data from a holiday or last year will not influence the current histogram. The running-operating system history may be set to only consider the last "X" response times, such as "X" ranging between 100 and 10,000. Additionally, the response times within each increment are averaged, so that each increment in the response-time versus utilization is represented by only one response time value. Such a histogram is shown below in Table 1.

TABLE 1

| Rt = 26 | | | | | | | | | X |
|---|---|---|---|---|---|---|---|---|---|
| 25 | | | | | | | | | X |
| 24 | | | | | | | | | X |
| 23 | | | | | | | | | X |
| 22 | | | | | | | | | X |
| 21 | | | | | | | | | X |
| 20 | | | | | | | | | X |
| 19 | | | | | | | | | X |
| 18 | | | | | | | | X | X |
| 17 | | | | | | | | X | X |
| 16 | | | | | | | | X | X |
| 15 | | | | | | | | X | X |
| 14 | | | | | | | | X | X |
| 13 | | | | | | | X | X | X |
| 12 | | | | | | | X | X | X |
| 11 | | | | | | | X | X | X |
| 10 | | | | | | | X | X | X |
| 9 | | | | | | | X | X | X |
| 8 | | | | | | X | X | X | X |
| 7 | | | | | | X | X | X | X |
| 6 | | | | | | X | X | X | X |
| 5 | | | | | X | X | X | X | X |
| 4 | | | | | X | X | X | X | X |
| 3 | | | | X | X | X | X | X | X |
| 2 | | | X | X | X | X | X | X | X |
| 1 | X | X | X | X | X | X | X | X | X |
| 0 | X | X | X | X | X | X | X | X | X |
| U % | 0% | 10% | 20% | 30% | 40% | 50% | 60% | 70% | 80% |
| Range | 0-5 | 5-15 | 15-25 | 25-35 | 35-45 | 45-55 | 55-65 | 65-75 | 75-85 |

TABLE 2 shows the optional linear least-squares smoothing of the response times in TABLE 1. This may be done to smooth out the values of the histogram in TABLE 1, to make for more accurate first derivatives in TABLES 3 and 4. The interior points in TABLE 2 are simply the average of the response time with its left and right neighbors. The two end points, U=0% and U=100%, use a different equation to achieve the linear least-squares smoothing of response time Rt. Additionally, the derivatives in TABLES 3 and 4 could be smoothed as part of a post-processing operation, by applying the algorithm in TABLE 2 to dRt/dU in TABLES 3 and 4.

TABLE 2

| U | Rt_s = Smoothing of Response Time Rt |
|---|---|
| 0% | Rt_s(0%) = [−Rt(U = 20%] + 2 * Rt(U = 10%) + 5 * Rt(U = 0%)]/6 |
| 10% | Rt_s(10%) = [Rt(U = 20%) + Rt(U = 10%) + Rt(U = 0%)]/3 |
| 20% | Rt_s(20%) = [Rt(U = 30%) + Rt(U = 20%) + Rt(U = 10%)]/3 |
| 30% | Rt_s(30%) = [Rt(U = 40%) + Rt(U = 30%) + Rt(U = 20%)]/3 |
| 40% | Rt_s(40%) = [Rt(U = 50%) + Rt(U = 40%) + Rt(U = 30%)]/3 |
| 50% | Rt_s(50%) = [Rt(U = 60%) + Rt(U = 50%) + Rt(U = 40%)]/3 |
| 60% | Rt_s(60%) = [Rt(U = 70%) + Rt(U = 60%) + Rt(U = 50%)]/3 |
| 70% | Rt_s(70%) = [Rt(U = 80%) + Rt(U = 70%) + Rt(U = 60%)]/3 |
| 80% | Rt_s(80%) = [Rt(U = 90%) + Rt(U = 80%) + Rt(U = 70%)]/3 |
| 90% | Rt_s(90%) = [Rt(U = 100%) + Rt(U = 90%) + Rt(U = 80%)]/3 |
| 100% | Rt_s(100%) = [5 * Rt(U = 100] + 2 * Rt(U = 90%) − Rt(U = 80%)]/6 |

TABLE 3 shows the use of discrete differentiation, which may also be called finite difference differentiation, to calculate the first discrete derivative dRt/dU at U=0%, U=10%, U=20%, up to U=100%. This choice in increments in utilization U gives equal space variable "h" a value of 10%. A smaller value of "h" could be 5% and dR/dU would be calculated at U=0%, U=5%, U=10%, up to U=100%. The value of "h" equaling 10% was chosen for TABLE 1.

TABLE 3

| U | dRt/dU |
|---|---|
| 0% | dRt/dU = [−Rt(U = 20%) + 4 * Rt(U = 10%) − 3 * Rt(U = 0%)]/(2h) |
| 10% | dRt/dU = [Rt(U = 20%) − Rt(U = 0%)]/(2h) |
| 20% | dRt/dU = [Rt(U = 30%) − Rt(U = 10%)]/(2h) |
| 30% | dRt/dU = [Rt(U = 40%) − Rt(U = 20%)]/(2h) |
| 40% | dRt/dU = [Rt(U = 50%) − Rt(U = 30%)]/(2h) |
| 50% | dRt/dU = [Rt(U = 60%) − Rt(U = 40%)]/(2h) |
| 60% | dRt/dU = [Rt(U = 70%) − Rt(U = 50%)]/(2h) |
| 70% | dRt/dU = [Rt(U = 80%) − Rt(U = 60%)]/(2h) |
| 80% | dRt/dU = [Rt(U = 90%) − Rt(U = 70%)]/(2h) |
| 90% | dRt/dU = [Rt(U = 100%) − Rt(U = 80%)]/(2h) |
| 100% | dRt/dU = [3 * Rt(U = 100%) − 4 * Rt(U = 90%) + Rt(U = 80%)]/(2h) |

Since "h"=10% (0.1), this gives 2 h a value of 0.2 and TABLE 3 can be simplified into TABLE 4, where ½h is equal to 5.

TABLE 4

| U | dRt/dU |
|---|---|
| 0% | dRt/dU = 5 * [−Rt(U = 20%) + 4 * Rt(U = 10%) − 3 * Rt(U = 0%)] |
| 10% | dRt/dU = 5 * [Rt(U = 20%) − Rt(U = 0%)] |
| 20% | dRt/dU = 5 * [Rt(U = 30%) − Rt(U = 10%)] |
| 30% | dRt/dU = 5 * [Rt(U = 40%) − Rt(U = 20%)] |
| 40% | dRt/dU = 5 * [Rt(U = 50%) − Rt(U = 30%)] |
| 50% | dRt/dU = 5 * [Rt(U = 60%) − Rt(U = 40%)] |
| 60% | dRt/dU = 5 * [Rt(U = 70%) − Rt(U = 50%)] |
| 70% | dRt/dU = 5 * [Rt(U = 80%) − Rt(U = 60%)] |
| 80% | dRt/dU = 5 * [Rt(U = 90%) − Rt(U = 70%)] |
| 90% | dRt/dU = 5 * [Rt(U = 100%) − Rt(U = 80%)] |
| 100% | dRt/dU = 5 * [3 * Rt(U = 100%) − 4 * Rt(U = 90%) + Rt(U = 80%)] |

Any dRt/dU derivatives in TABLE 3 or TABLE 4 that are calculated as negative would be reset to zero, because the response time Rt versus system utilization U is a monotonically increasing function. The smoothing of response time Rt in TABLE 2 is not used in TABLES 3 and 4. If Rt_s is substituted for Rt in TABLES 3 and 4, then the differentiation of smoothed data will be accomplished. The appropriate value of dRt/dU from either TABLE 3 or TABLE 4 would be used in the truncated Taylor Series to estimate the new response time Rt(U+ΔU), based on the current utilization U, left column in TABLES 3 and 4, and the discrete derivative dRt/dU in the right column of TABLES 3 and 4.

$$Rt(U + \Delta U) = Rt(U) + \frac{\frac{dRt}{dU}}{1!}(\Delta U) \quad \text{(equation 14)}$$

Since 1!=1, EQUATION 14 may be simplified into equation 15:

$$Rt(U + \Delta U) = Rt(U) + \frac{dRt}{dU}(\Delta U) \quad \text{(equation 15)}$$

Except for the end points of U=0% and U=100%, the equations for dRt/dU in TABLES 3 and 4 were derived by passing the Lagrangian interpolation polynomial of degree two through the three adjacent datapoints, (U(i−h), Rt(i−h)), (U(i), Rt(i)), and (U(i+h), Rt(i+h)). This alternative embodiment of discrete differentiation could be run in parallel with the aforementioned analytical differentiation of the Pollaczek-Khinchine equation, EQUATION 3, to see which gives the best estimates of response time versus the actual resulting response time. It is possible that one method might work better when ΔU>0 and another method might work better when ΔU<0. It is interesting to note that the discrete differentiation might give a more accurate answer at U=100%, because it would take an infinite amount of time to build an infinitely long queue as predicted by the Pollaczek-Khinchine equation, EQUATION 3. If second derivatives of response time Rt versus utilization u were desired, the same equations in TABLES 3 and 4 would be applied, but to the calculated first derivatives of response time versus utilization. If third derivatives of response time Rt versus utilization U were desired, the same equations in TABLES 3 and 4 would be applied, but now to the second derivatives of response time versus utilization.

TABLE 5

Figure 5:
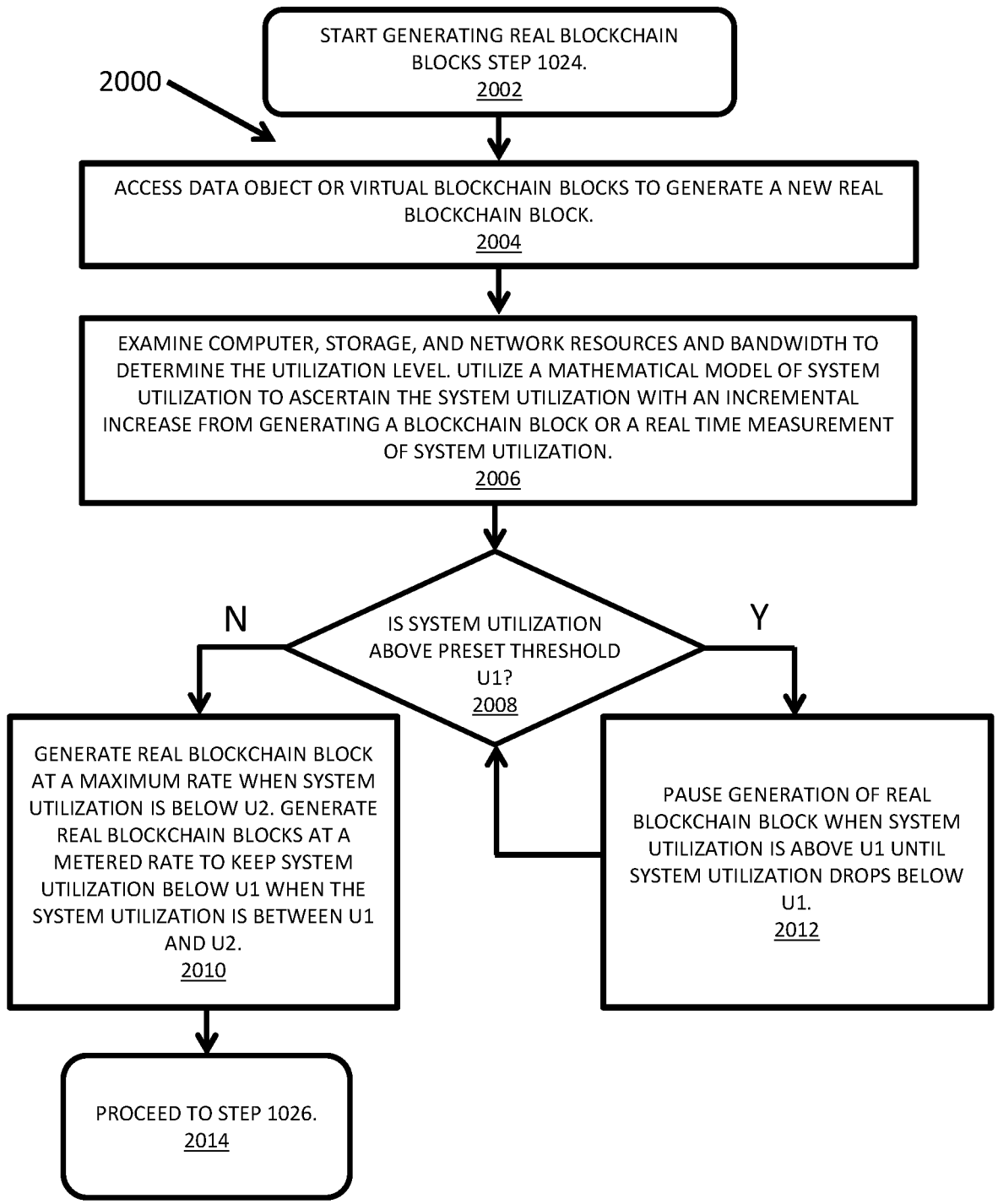
FIG. 5 illustrates a flowchart depicting a blockchain block generation subprocess where blockchain block generation is unrestricted, metered, or paused depending upon utilization of a network computer resource when compared to a preset threshold.

| Utilization U | Rt = 1/(1 − U) [eqn. 3 with St = 1] | dRt/dU Analytical [eqn. 4] | dRt/dU Discrete FIG. 5 |
|---|---|---|---|
| 0% | 1.00 | 1.00 | 1.00 |
| 10% | 1.11 | 1.23 | 1.25 |
| 20% | 1.25 | 1.56 | 1.59 |
| 30% | 1.43 | 2.04 | 2.08 |
| 40% | 1.67 | 2.78 | 2.86 |
| 50% | 2.00 | 4.00 | 4.17 |
| 60% | 2.50 | 6.25 | 6.67 |
| 70% | 3.33 | 11.11 | 12.50 |
| 80% | 5.00 | 25.00 | 33.33 |

TABLE 5 shows a numerical comparison between the analytical derivative and the discrete derivative of TABLE 4, as done via an EXCEL® spreadsheet. The assumption here is that the service time St is set to unity because it is unknown. There is excellent agreement between the analytical and discrete derivatives for U≤50%. However, for U≥60%, the discrete derivative overestimates the actual derivative of response time Rt, which is the analytical derivative. This could be resolved by taking h to be a smaller increment, such as h=5% rather than h=10%. Thus, if high utilizations are to be considered in any such artificial intelligence algorithm, a smaller increment h may be in order.

FIG. 5 illustrates a flowchart 2000 depicting a blockchain block generation subprocess 2000 where blockchain block generation is unrestricted, metered, or paused depending upon utilization of a network computer resource when compared to a preset threshold. Process 2000 is a detailed description of step 1024 from FIG. 2. Process 2000 for generating real blockchain blocks begins with START 2002. In step 2004, blockchain application 14 accesses a data object to generate a real blockchain block off it. Alternatively, blockchain application 14 accesses a virtual blockchain block generated in step 1012 shown in FIG. 2 to generate a real blockchain block off of it once the utilization drops below preset threshold U1. In step 2006, blockchain application 14 examines the computer, storage, network, and transmission link resources illustrated in FIG. 1 to determine their level of utilization and predict what incremental increase in utilization will occur based upon a mathematical model as discussed with respect to FIG. 4. If the current utilization plus the incremental increase from generating a new blockchain block causes the utilization to exceed the preset threshold U1 as set forth in process step 2008, then in step 2012, the blockchain application 14 pauses the generation of real blockchain blocks until utilization drops below preset threshold U1. Once utilization does drop below preset threshold U1, then in step 2010, blockchain application 14 generates real blockchain blocks at a maximum rate when system utilization is below preset threshold U2. In step 2010, if system utilization is above preset threshold U2, but below preset threshold U1, then blockchain application 14 generates new blockchain blocks at a metered rate to keep system utilization below preset threshold U1. The metered rate is determined using the mathematical models discussed with respect to FIG. 4. The process then proceeds to step 2014 which continues with step 1026 in FIG. 3.

Figure 6:
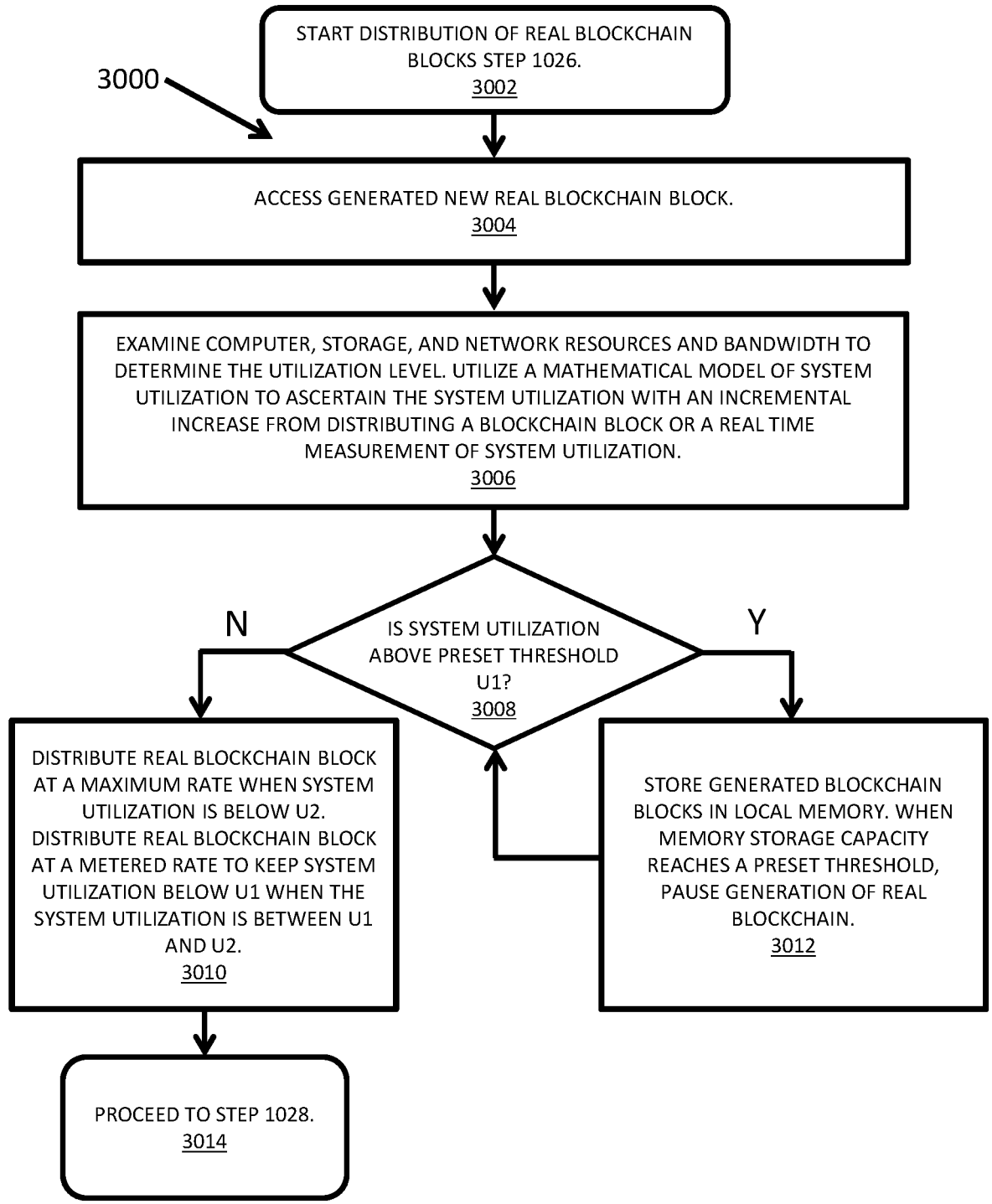
FIG. 6 illustrates a flowchart depicting a blockchain block distribution subprocess where blockchain block distribution is unrestricted, metered, or paused depending upon utilization of a network computer resource when compared to a preset threshold.

FIG. 6 illustrates a flowchart 3000 depicting a blockchain block distribution subprocess 3000 where blockchain block distribution is unrestricted, metered, or paused depending upon utilization of a network computer resource when compared to a preset threshold. Subprocess 3000 is a detailed expanded disclosure of step 1026 from FIG. 3. The process of distributing real blockchain blocks begins with step 3002. In step 3004, blockchain application 14 accesses the generated real blockchain block created in step 1024 shown in FIG. 3 per process 2000 shown in FIG. 5. In step 3006, the blockchain application 14 examines the computer, storage, network, and transmission link system resources illustrated in FIG. 1 to determine their level of utilization and predict what incremental increase in utilization will occur based upon a mathematical model as discussed with respect to FIG. 4. If the current utilization plus the incremental increase from distributing the new blockchain block causes the utilization to exceed the preset threshold U1 as set forth in process step 3008, then in step 3012, the blockchain application 14 does not distribute the real blockchain blocks onto the distributed network. Instead, blockchain application 14 stores the new real blockchain block locally within memory 18 or local external storage 20. If memory 18 or local external storage 20 have their memory storage capacities reach a preset threshold, the blockchain application 14 pauses future generation of new real blockchain blocks until such time as the utilization drops below preset threshold U1 so that the stored blockchain blocks can be moved out of memory 18 or local storage 20 and deleted from that memory. Once utilization does drop below preset threshold U1, then in step 3010, blockchain application 14 distributes real blockchain blocks at a maximum rate when system utilization is below preset threshold U2. In step 3010, if system utilization is above preset threshold U2, but below preset threshold U1, then blockchain application 14 distributes new blockchain blocks at a metered rate to keep system utilization below preset threshold U1. The process then proceeds to step 3014 which continues with step 1028 in FIG. 3.

Figure 7:
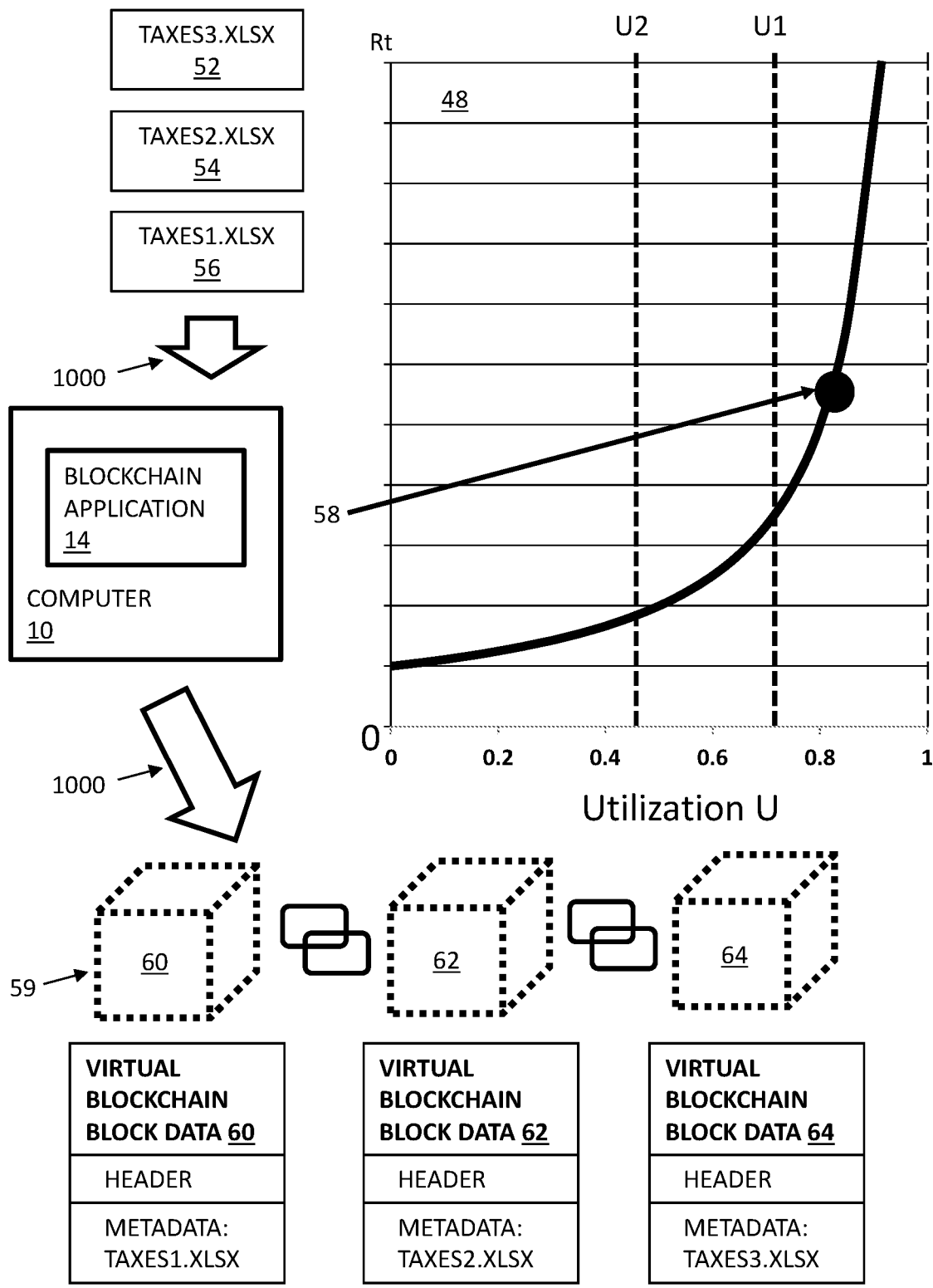
FIG. 7 illustrates a process flow diagram depicting the creation of virtual blockchain blocks when utilization of network computer resources exceeds a preset threshold as illustrated on a network computer resource utilization diagram where system utilization is plotted against system response time along with illustrating a virtual blockchain and the data contained within each of the virtual blockchain blocks.

FIG. 7 illustrates a process flow diagram depicting the creation of virtual blockchain blocks 60, 62, and 64 which form a virtual blockchain 59 when utilization of network computer resources exceeds a preset threshold U1 as illustrated on a network computer resource utilization diagram 48 where system utilization is plotted against system response time along with illustrating a virtual blockchain 59 and the data objects 52, 54, and 56 contained within each of the virtual blockchain blocks 60, 62, 64. In FIG. 7, three data objects are shown 52, 54, and 56. Data object 52 is an EXCEL® spreadsheet file named TAXES3.XLSX. Data object 54 is an EXCEL® spreadsheet file named TAXES2.XLSX. Data object 56 is an EXCEL® spreadsheet file named TAXES1.XLSX. All three data objects 52, 54, and 56 are received by computer 10 and handled by blockchain application 14 per process 1000 outlined in FIG. 1. Blockchain application 14, after it receives data objects 52, 54, and 56, then proceeds to examine the system utilization as modeled diagrammatically in diagram 48. As shown by diagram 48 in FIG. 7, system utilization 59 is shown as being above preset threshold U1. As system utilization 58 is above preset threshold U1, per process 1000, blockchain application 14 does not generate new real blockchain blocks based on data objects 52, 54, and 56. Instead, as system utilization 59 is above preset threshold U1, per process 1000, blockchain application 14 generates virtual blockchain blocks 60, 62, and 64 based on data objects 52, 54, and 56. Virtual blockchain blocks 60, 62, and 64 are shown in dashed to denote that they are not real blockchain blocks. Virtual blockchain blocks 60, 62, and 64 are created by blockchain application 14 per process 1000. Virtual blockchain blocks 60, 62, and 64 form a virtual blockchain 59. Data tables are shown below each virtual blockchain block 60, 62, and 64 to show what information is contained within the virtual blockchain 59. Virtual blockchain 59 differs from a real blockchain in that the virtual blockchain 59 does not include any blockchain hash digests or store any data objects. Instead, virtual blockchain 59 contains metadata about the virtual blockchain block and metadata about the data object. Virtual blockchain 59 and its constituent blocks 60, 62, and 64 are computationally easy to assemble in that they just contain metadata about the data objects and the blockchain 59. None of the virtual blockchain blocks 60, 62, or 64 contain blockchain hash digests based on data objects 52, 54, and 56, which are computationally intensive to compute. Thus, virtual blockchain 59 and its constituent blocks 60, 62, and 64 are able to assemble data objects 52, 54, and 56 into a virtual blockchain structure as a preparatory step towards creating real blockchain blocks while utilization 58 is above preset threshold U1. Assembling data objects 52, 54, and 56 into virtual blockchain 59 serves as a preparatory step towards converting the virtual blockchain 59 into a real blockchain once utilization 58 falls below preset threshold U1.

Figure 8:
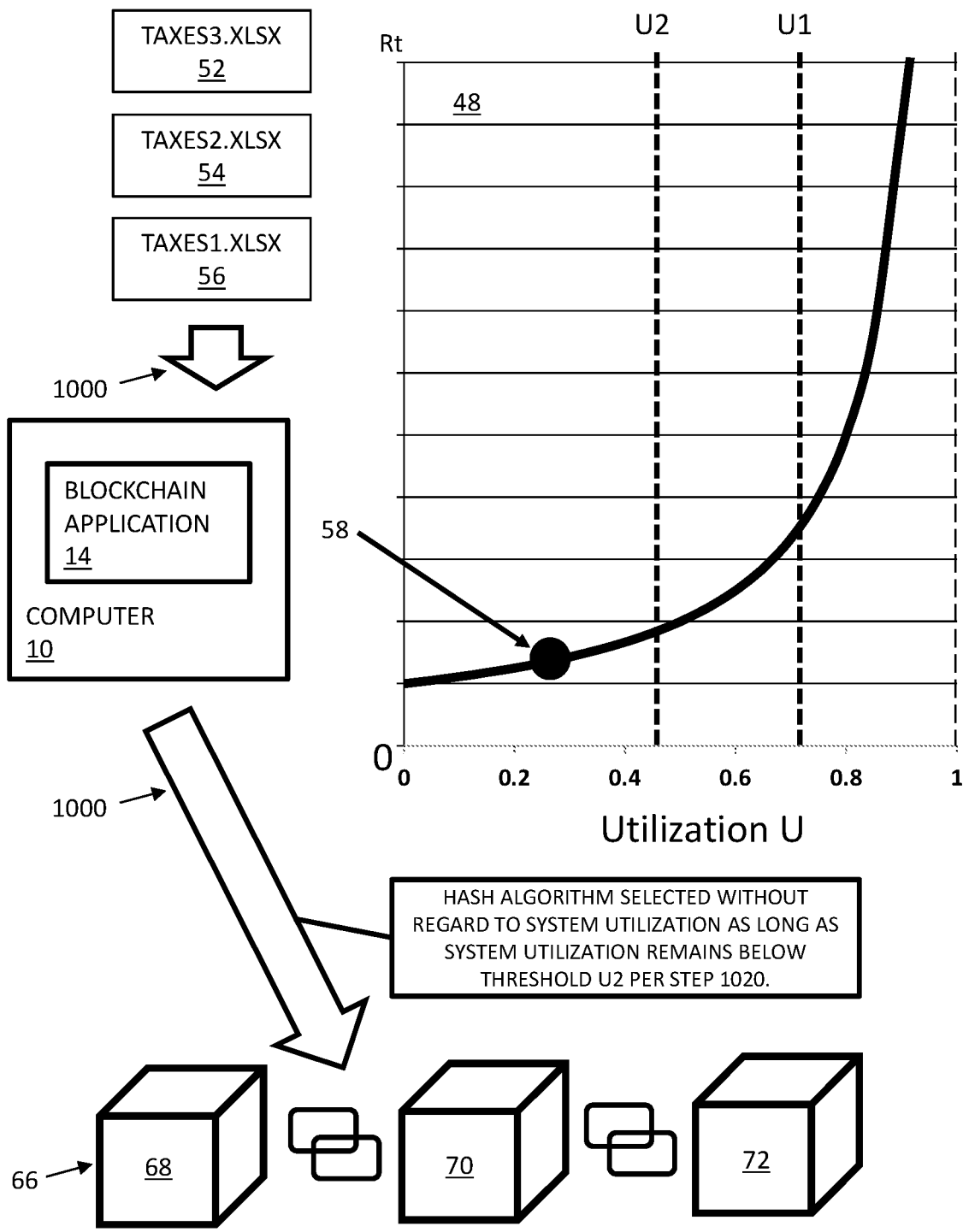
FIG. 8 illustrates a process flow diagram depicting the creation of real blockchain blocks at an unrestricted rate when utilization of network computer resources falls below a preset threshold as illustrated on a network computer resource utilization diagram where system utilization is plotted against system response time.

FIG. 8 illustrates a process flow diagram depicting the creation of real blockchain blocks 66 at an unrestricted rate when utilization of network computer resources falls below a preset threshold U2 as illustrated on a network computer resource utilization diagram 48 where system utilization is plotted against system response time. In FIG. 8, three data objects 52, 54, and 56 are shown. Data object 52 is an EXCEL® spreadsheet file named TAXES3.XLSX. Data object 54 is an EXCEL® spreadsheet file named TAXES2.XLSX. Data object 56 is an EXCEL® spreadsheet file named TAXES1.XLSX. All three data objects 52, 54, and 56 are received by computer 10 and handled by blockchain application 14 per process 1000 outlined in FIG. 1. Blockchain application 14, after it receives data objects 52, 54, and 56, then proceeds to examine the system utilization as modeled diagrammatically in diagram 48. As shown by diagram 48 in FIG. 8, system utilization 58 is shown as being below preset threshold U2. As system utilization 58 is below preset threshold U2, per process 1000, blockchain application 14 generates new real blockchain blocks 68, 70, and 72 based on data objects 52, 54, and 56. As system utilization 58 is below preset threshold U2, per process 1000, blockchain application 14 generates new real blockchain blocks 68, 70, and 72 directly without generating any virtual blockchain blocks. Real blockchain blocks 68, 70, and 72 form a real blockchain 66. For the creation of blockchain 66, the hash algorithm is selected without regard to system utilization as long as system utilization remains below threshold U2 per step 1020 in FIG. 2. Real blockchain blocks 68, 70, and 72 include blockchain hash digests based upon data objects 52, 54, and 56 and also store data objects 52, 54, and 56. Blockchain blocks 68, 70, and 72 also include metadata based upon data objects 52, 54, and 56 as well as metadata based on blockchain 66.

Figure 9:
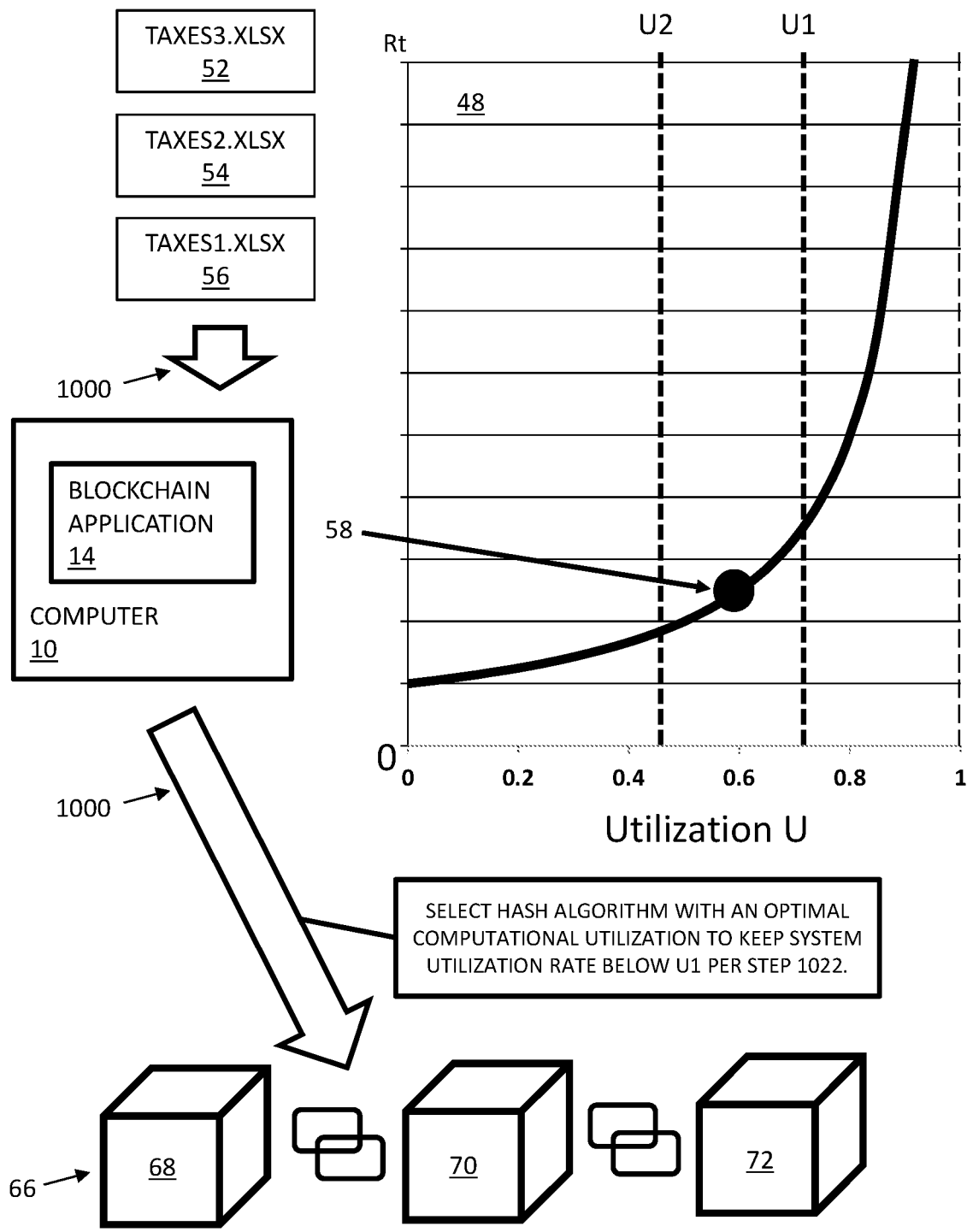
FIG. 9 illustrates a process flow diagram depicting the creation of real blockchain blocks created with an optimal hash algorithm when utilization of network computer resources falls between two preset thresholds as illustrated on a network computer resource utilization diagram where system utilization is plotted against system response time.

FIG. 9 illustrates a process flow diagram depicting the creation of real blockchain blocks 68, 70, and 72 created with an optimal hash algorithm when utilization of network computer resources falls between two preset thresholds U1 and U2 as illustrated on a network computer system resource utilization diagram 48 where system utilization is plotted against system response time. In FIG. 9, three data objects 52, 54, and 56 are shown. Data object 52 is an EXCEL® spreadsheet file named TAXES3.XLSX. Data object 54 is an EXCEL® spreadsheet file named TAXES2.XLSX. Data object 56 is an EXCEL® spreadsheet file named TAXES1.XLSX. All three data objects 52, 54, and 56 are received by computer 10 and handled by blockchain application 14 per process 1000 outlined in FIG. 1. Blockchain application 14, after it receives data objects 52, 54, and 56, then proceeds to examine the system utilization as modelled modeled diagrammatically in diagram 48. As shown by diagram 48 in FIG. 9, system utilization 58 is shown as being below preset threshold U1 and above preset threshold U2. As system utilization 58 is between preset thresholds U1 and U2, per process 1000, blockchain application 14 generates new real blockchain blocks 68, 70, and 72 based on data objects 52, 54, and 56 at a metered rate based on use of the mathematical models discussed in FIG. 4. As system utilization 58 is between preset thresholds U1 and U2, per process 1000, blockchain application 14 generates new real blockchain blocks 68, 70, and 72 directly without generating any virtual blockchain blocks. Real blockchain blocks 68, 70, and 72 form a real blockchain 66. For the creation of blockchain 66, an optimal hash algorithm is selected per process 1000 and 4000 via examination of the system utilization to keep system utilization below threshold U1 per step 1022 in FIG. 2 and process 4000 in FIG. 12. Real blockchain blocks 68, 70, and 72 include blockchain hash digests based upon data objects 52, 54, and 56 and also store data objects 52, 54, and 56. Blockchain blocks 68, 70, and 72 also include metadata based upon data objects 52, 54, and 56 as well as metadata based on blockchain 66. The process for optimally selecting the hash algorithm used to generate blockchain 66 is discussed in more detail in process 4000 shown in FIG. 12. If the utilization of the system falls below threshold U2, then blockchain application 14 operates as discussed in FIG. 8 per process 1000. If the utilization of the system falls above threshold U1, then the blockchain application operates as discussed in FIG. 7.

Figure 10:
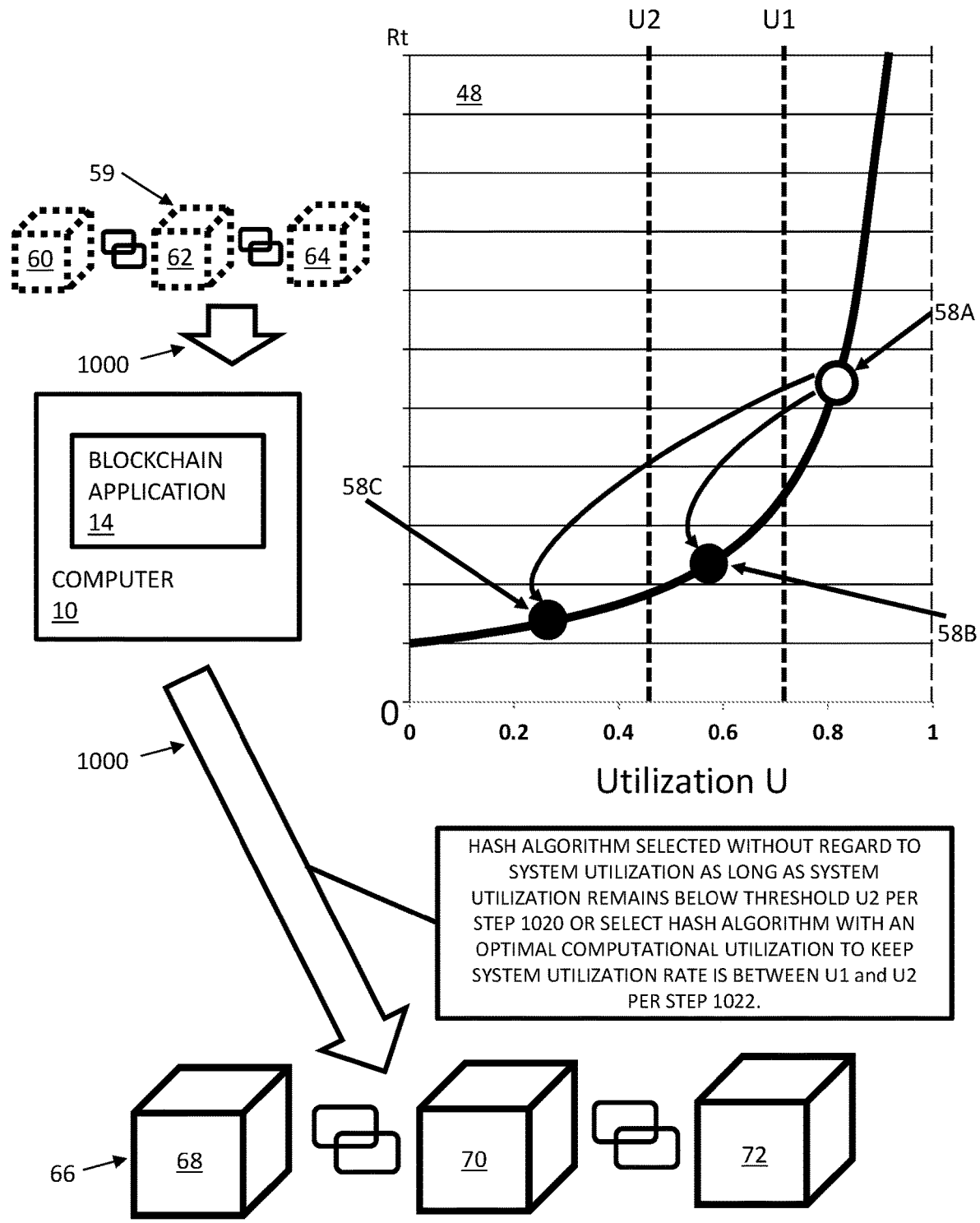
FIG. 10 illustrates a process flow diagram depicting the conversion of virtual blockchain blocks to real blockchain blocks when utilization of network computer resources transitions to being below preset threshold as illustrated on a network computer resource utilization diagram where system utilization is plotted against system response time.

FIG. 10 illustrates a process flow diagram depicting the conversion of virtual blockchain blocks 60, 62, and 64 to real blockchain blocks 68, 70, and 72 when utilization of network computer resources transitions to being below preset threshold U1 as illustrated on a network computer system resource utilization diagram 48 where system utilization is plotted against system response time. Per FIG. 7, when system utilization is above preset threshold U1 at position 58A, blockchain application 14 generates virtual blockchains 59 as shown in FIG. 10. When system utilization falls from utilization position 58A to positions 58B or 58C, both of which are below preset utilization threshold U1, blockchain application 14 converts virtual blockchain 59 to a real blockchain 66 per process 1000. When the utilization drops below preset threshold U1, blockchain application 14 accesses the virtual blockchain 59, which is formed of virtual blockchain blocks 60, 62, and 64, and converts the virtual blockchain 59 to real blockchain 66, which is formed of real blockchain blocks 68, 70, and 72. Virtual blockchain block 60 is converted to real blockchain block 68. Virtual blockchain block 70 is converted to real blockchain block 70. Virtual blockchain block 72 is converted to real blockchain block 72. When utilization drops to position 58C below preset threshold U2, the hash algorithm is selected without regard to system utilization for converting the virtual blockchain 59 to real blockchain 66 as long utilization remains below preset threshold U2. When utilization is below preset threshold U2, any hash algorithm may be used by the blockchain application to generate blockchain 66. When utilization drops from position 58A to 58B, which is between preset thresholds U1 and U2, blockchain application 14 converts virtual blockchain 59 to real blockchain 66 using an optimal hash algorithm as discussed in FIG. 9 and step 1022 in FIG. 2. FIG. 10 shows the mechanics of how virtual blockchains 59 are converted into real blockchains 66 when utilization drops below preset threshold U1. As there is a second preset threshold U2, utilization may drop below U1 but remain above U2, or also drop below U2. In both cases, when utilization falls below U1, blockchain application 14 converts virtual blockchain 59 to real blockchain 66.

FIG. 11 illustrates a real blockchain 66 formed of a series of blockchain blocks 68, 70, and 72 along with the data objects contained within each of the blockchain blocks 68, 70, and 72. Real blockchain 66 includes blockchain hash digests and data objects stored within each of the blockchain blocks 68, 70, and 72. Below the block diagram of blockchain 66 are three tables listing the data contained within each of the real blockchain blocks 68, 70, and 72. Real blockchain block 68 includes a header including any blockchain metadata and metadata on that particular blockchain block. Stored within blockchain block 68 is the data object TAXES1.XLSX, which is an EXCEL® spreadsheet file. Blockchain block also includes a blockchain hash digest of a prior blockchain block (not shown) and a blockchain hash digest of current blockchain block 68. Blockchain block 68 may include other information related to blockchain 66. Real blockchain block 70 includes a header including any blockchain metadata and metadata on that particular blockchain block. Stored within blockchain block 70 is the data object TAXES2.XLSX, which is an EXCEL® spreadsheet file. Blockchain block also includes a blockchain hash digest of a prior blockchain block 68 and a blockchain hash digest of current blockchain block 70. Blockchain block 70 may include other information related to blockchain 66. Real blockchain block 72 includes a header including any blockchain metadata and metadata on that particular blockchain block. Stored within blockchain block 72 is the data object TAXES3.XLSX, which is an EXCEL® spreadsheet file. Blockchain block also includes a blockchain hash digest of a prior blockchain block 70 and a blockchain hash digest of current blockchain block 72. Blockchain block 72 may include other information related to blockchain 66.

FIG. 12 illustrates a flowchart 4000 depicting a process 4000 for dynamically varying the selection of hash algorithm used to generate blockchain blocks 68, 70, and 72 in order to maintain computer network resource utilization below a preset threshold as illustrated on a network computer resource utilization diagram 48 where system utilization is plotted against system response time. When system utilization is below preset threshold U2, system response time Rt exhibits moderate increases in response to any increase in system utilization below preset threshold U2. Above preset threshold U1, system response time Rt exhibits sharp increases in response to small increases in utilization. Between preset thresholds U1 and U2. Rt shows heightened sensitivity to increases in system utilization above that observed below preset threshold U2. To manage response time Rt and system utilization between preset thresholds U1 and U2, blockchain application 14 may vary the selection of hash algorithm used to lighten the work imposed on the system and in turn reduce the utilization. Different hash algorithms impose different amounts of work on the system due to the computational complexity of the different hash algorithms. The varying amount of utilization 58 between thresholds U1 and U2 is shown by the curved double ended arrow. The process of selecting an optimal hash algorithm per a preset rule is outlined in flowchart 4000 depicting process 4000 for choosing an optimal hash algorithm per step 1022. Process 4000 is a detailed expansion of the process step 1022 shown in FIG. 2. Process 4000 begins with START 4002. In step 4004, blockchain application 14 simulates utilization of the system using a mathematical model to determine the incremental increase in system utilization from current utilization for each hash algorithm as discussed with respect to FIG. 4. Alternatively, blockchain application 14 may use a history of actual system utilization and response time that is used as a model for utilization and response time as discussed in FIG. 4. The increase in system utilization may be ascertained for any hash algorithm such as MD5, SHA-224, SHA-256, SHA-384, SHA-512, SHA-512/224, SHA-512/256. This listing of hash algorithms is exemplary and is not limiting. In step 4006, a hash algorithm is selected that does not push the system utilization 58 past threshold U1 per a preset rule. The preset rule may be to specify one of the hash algorithms as a desired algorithm while allowing blockchain application to select less computationally intensive hash algorithms as necessary when use of the desired algorithm pushes the utilization past preset threshold U1. An alternative preset rule may be to select the strongest hash algorithm at any given time for use in blockchaining that does not push utilization past preset threshold U1. In step 4008, blockchain application 14 may dynamically vary which hash algorithm is used for successive blockchain blocks within the same blockchain based on time varying system utilization according to step 4004 per one of the above discussed preset rules. In step 4010, proceed to step 1024.

Figure 13:
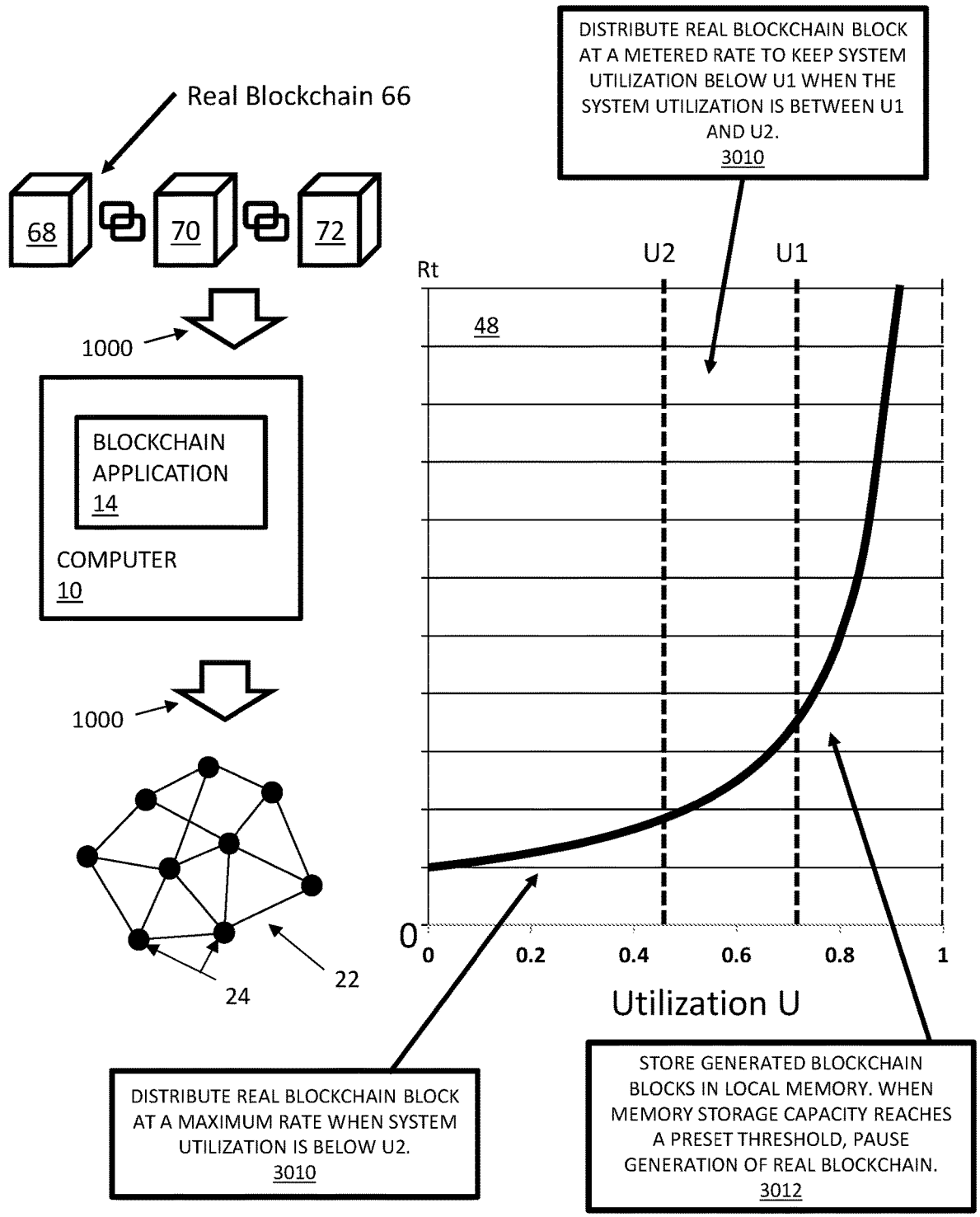
FIG. 13 illustrates a process flow diagram depicting the distribution of real blockchain blocks onto a distributed network based on utilization of network computer resources as illustrated on a network computer resource utilization diagram where system utilization is plotted against system response time.

FIG. 13 illustrates a process flow diagram depicting the distribution of real blockchain blocks 68, 70, 72 onto a distributed network 22 based on utilization of network computer resources as illustrated on a network computer resource utilization diagram 48 where system utilization is plotted against system response time. In this figure, blockchain application 14 is operating on the operating system 12 of computer 10. Blockchain application 14 accesses real blockchain 66 and distributes it onto distributed network 22 that includes nodes 24 per process 1000. The manner in which blockchain 66 is distributed onto distributed network 22 varies depending upon where the system utilization is on diagram 48 with respect to preset thresholds U2 and U1. If system utilization is below preset threshold U2, blockchain application 14 distributes real blockchain 66 onto distributed network 22 at an unrestricted rate per process step 3010 from FIG. 6. If system utilization is between preset thresholds U1 and U2, blockchain application 14 distributes real blockchain blocks at a metered rate to keep system utilization below U1. In this region between U1 and U2, allowing unrestricted distribution of blockchain blocks 68, 70, and 72 onto network 72 may cause utilization to exceed preset threshold U1. Thus, metering the rate at which blockchain blocks 68, 70, and 72 are generated and distributed can maintain overall system utilization below preset threshold U1 per step 2010 from FIG. 6. If system utilization exceeds preset threshold U1, blockchain blocks 68, 70, and 72 are not distributed onto network 72. Instead, blockchain blocks 68, 70, and 72 are stored locally in memory 18 or local storage 20 until utilization drops below preset threshold U1 per step 3012 from FIG. 6. In addition, as long as utilization is above preset threshold U1, generation of real blockchain blocks 68, 70, 72 are paused while virtual blockchain blocks 60, 62, and 64 are created instead.

Figure 14:
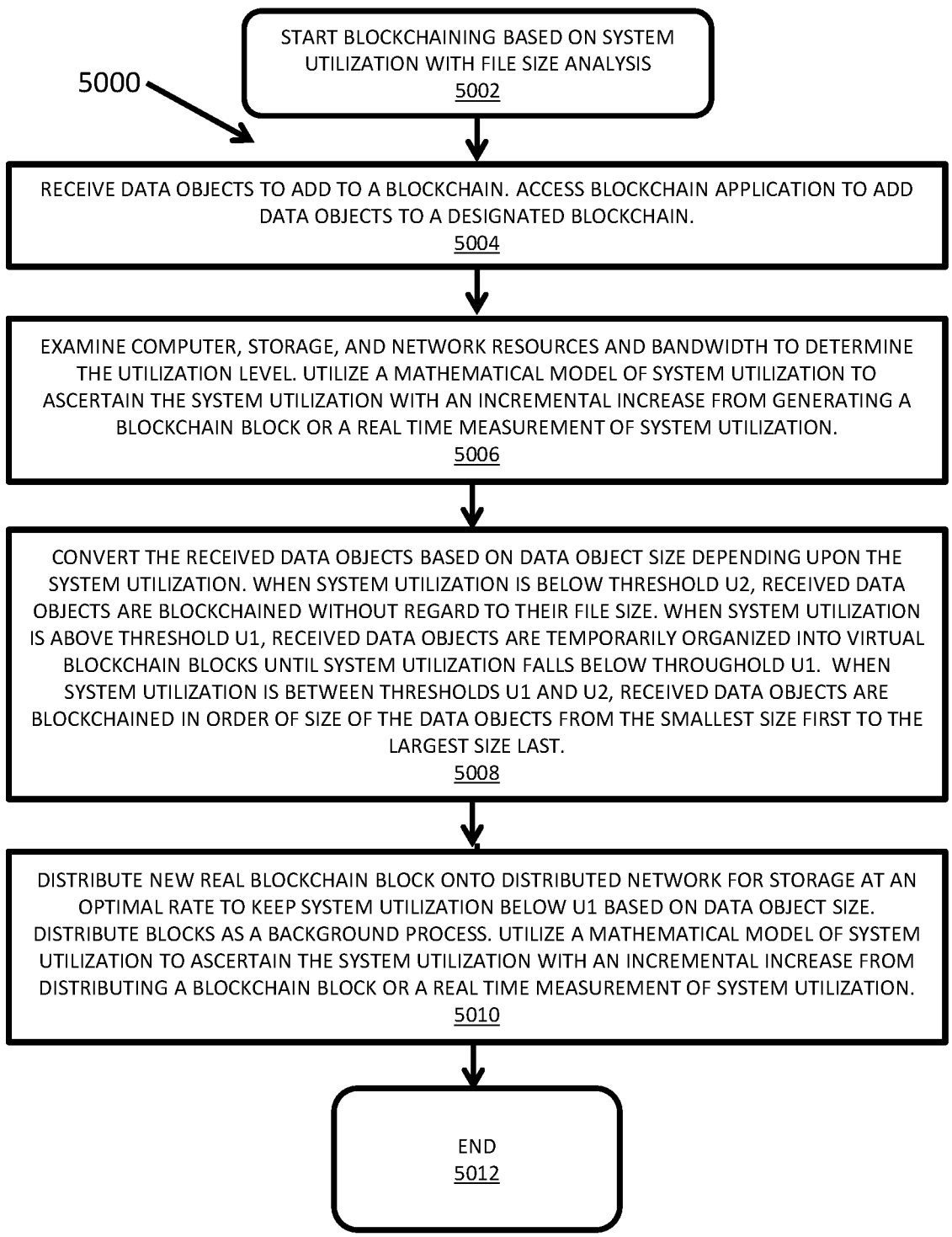
FIG. 14 illustrates a flowchart depicting a process for blockchaining data objects based on the size of each data object according to the utilization of network computer resources.

FIG. 14 illustrates flowchart 5000 depicting a process 5000 for blockchaining data objects based on the size of each data object according to the utilization of network computer resources. The process of generating and distributing blockchains may create different amounts of work impacting utilization for the system shown in FIG. 1 depending upon the size of the data object. Large data objects such as movies that may be recorded in 4K or 16K may consume a huge amount of network computer system resources in order to complete the blockchaining process. Small data objects like basic EXCEL® spreadsheets, word processing documents, POWERPOINT® presentations, MP3 files, financial transactions, or anything below for example 5 MB of data may consume very little computing resources and have little impact on system utilization. Thus, it may be possible to blockchain some mid-sized or small-sized data objects when system utilization is between preset thresholds U2 and U1 without having a negative impact on system utilization that would push utilization past preset threshold U1. However, blockchaining large or extremely large data objects may have a hugely negative impact on system utilization between preset thresholds U1 and U2 and as such be performed only when utilization is below preset threshold U2. Thus, process 5000 outlines a software routine where data objects are examined based upon their data size and are blockchained according to the file size and the utilization and how utilization falls within preset thresholds U1 and U2. The process begins with START 5002. In step 5004, blockchain application 14 accesses or receives data objects to add to a blockchain that has been designated by a user or other application through blockchain application 14. These data objects have a variable file size ranging from kilobytes, to terabytes, to vastly larger data sizes. In step 5006, blockchain application 14 examines the computer, storage, network, and transmission link resources illustrated in FIG. 1 to determine their level of utilization and predict what incremental increase in utilization will occur based upon a mathematical model as discussed with respect to FIG. 4. In step 5006, blockchain application 14 determines the incremental increase to system utilization based upon the predicted work it would take to blockchain the data object received in step 5004. In step 5008, the blockchain application 14 converts the received data objects based upon data object size depending upon the system utilization. When system utilization is below preset threshold U2, received data objects are blockchained without regard to their file size. When system utilization is above preset threshold U1, received data objects are temporarily organized into virtual blockchain blocks until the preset threshold falls below U1 per process 1000 and subprocess 4000 as shown in FIGS. 7 and 10. When system utilization is between preset thresholds U2 and U1, received blockchain blocks are blockchained with respect to preset rules based upon their file size. For example, files may be blockchained according to a Smallest File First-Fattest File Last (SFF-FFL) where the smallest of the data objects is blockchained first and the fattest or largest file is blockchained last. Alternatively, another preset rule may allow the blockchaining of data objects only up to a file size that does not push utilization over preset threshold U1. As such, under this preset rule, small and medium sized data objects may be allowed to be blockchained, but large and ultra large data objects may not be allowed to be blockchained as they may put system utilization over preset threshold U1. Step 5008 generates real blockchain blocks. Step 5008 may generate real blockchain blocks directly from data objects, or from virtual blockchain blocks that contain metadata on the data objects to be blockchained. Then in step 5010, the blockchain application 14 distributes the real blockchain blocks generated in 5008 onto a distributed network 22 for storage on nodes 24. If utilization is above preset threshold U1, per process 1000, distribution of new real blockchain blocks onto distributed network 22 is paused until utilization falls below preset threshold U1. When utilization is between preset thresholds U1 and U2, blockchain application 14 utilizes historical utilization data or a mathematical model of utilization to determine an optimal rate for distributing blockchain blocks onto distributed network 22 per the processes discussed in FIG. 4. This optimal rate may be a metered rate in which blockchain blocks are distributed at a certain data rate so as not to push system utilization past preset threshold U1. This optimal rate may be based upon file size in which an SFF-FFL rule is adopted where the smallest file is distributed first, which would take the smallest amount of utilization, and the fattest file is distributed last, which would take the largest amount of utilization. Below preset threshold U2, blockchain blocks are distributed at an unrestricted rate. The process ENDS in step 5012.

Figure 15:
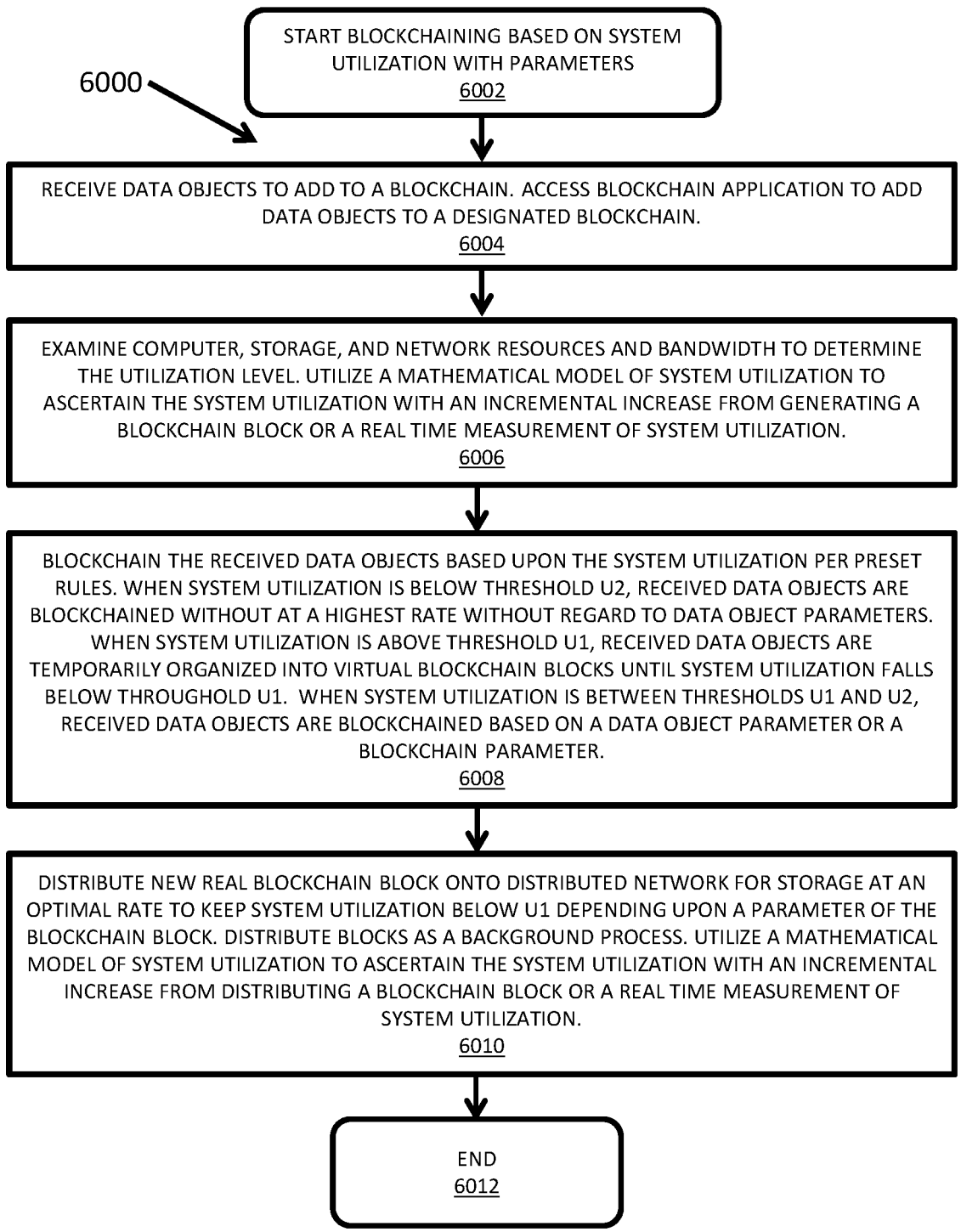
FIG. 15 illustrates a flowchart depicting a process for blockchaining data objects on based parameters of the data objects or parameters of a blockchain according to the utilization of network computer resources.

FIG. 15 illustrates a flowchart 6000 depicting a process 6000 for blockchaining data objects based on parameters of the data objects or parameters of a blockchain according to the utilization of network computer resources. The process for blockchaining based on system utilization and parameters of the data objects to be blockchained or parameters of the blockchain begins with step 6002. In step 6004, blockchain application 14 receives data objects to add to a specific blockchain identified by the blockchain application 14. In step 6006, blockchain application 14 examines the computer, storage, network, and transmission link resources illustrated in FIG. 1 to determine their level of utilization and predict what incremental increase in utilization will occur based upon a mathematical model as discussed with respect to FIG. 4. In step 6006, blockchain application 14 determines the incremental increase to system utilization based upon the predicted work it would take to blockchain the data object received in step 6004. In step 6008, the blockchain application 14 blockchains the received data objects based upon the system utilization per preset rules regarding parameters of the data objects of parameters of the blockchain. When system utilization is below preset threshold U2, received data objects are blockchained at an unrestricted rate without regard to parameters of the data objects or parameters of the blockchain. When system utilization is above preset threshold U1, received data objects are temporarily organized into virtual blockchain blocks until such time as system utilization falls below preset threshold U1. When system utilization is between preset thresholds U1 and U2, blockchain application 14 may determine which data objects are blockchained first based upon parameters of the data object such as file size, file type, file metadata, file hashtags, the software application associated with the file, a file priority identifier, or any other attribute associated with the data object. For example, blockchain application 14 may have a preset rule where data objects are blockchained in order of smallest to largest. Another preset rule may be based upon blockchaining files in order of a file type where spreadsheet documents are blockchained first, then word processing documents, then media files. Another preset rule may be where data objects are blockchained in order of the type of software application that created them, such as documents made by a word process are blockchained first, then documents made by a database application are blockchained next. Files may have a priority identifier associated with them where they are selected to be blockchained based on a user or application identified order. For example, a user or application may flag particular data objects as being priority data objects requiring them to be blockchained first in front of non-priority data objects. Data objects, which may be files, may be blockchained according to an order specified by rules prioritizing certain metadata over other metadata. When system utilization is between preset thresholds U1 and U2, blockchain application 14 may determine which data objects are blockchained first based upon parameters of the blockchain, such as hash algorithm, type of blockchain, metadata about the blockchain, or other parameter. For example, some blockchains may have computationally more intensive hash algorithms than other blockchains. A preset rule based upon hash algorithms may include a rule where blockchains with least computationally intensive hash algorithms are blockchained first. Blockchains may have a specific type of data associated with them. For example, there may be blockchains associated with financial transactions, consumer data, and social media interactions. Blockchains with financial data may be given priority for transactions over less critical blockchains for social media data. Thus, a rule based on the type of blockchain based upon its purpose, which may be expressed in its metadata, may be specified for use by blockchain application 14 in step 6008. In step 6010, blockchain blocks created in step 6008 are distributed for storage onto distributed network 22. In step 6010, blockchain application 14 examines the computer, storage, network, and transmission link system resources illustrated in FIG. 1 to determine their level of utilization and predict what incremental increase in utilization will occur based upon a mathematical model as discussed with respect to FIG. 4. In step 6010, blockchain application 14 determines the incremental increase to system utilization based upon the predicted work it would take to distribute the generated blockchain blocks made in step 6008. In step 6010, the blockchain application 14 distributes the received real blockchain blocks based upon the system utilization per preset rules regarding parameters of the blockchain blocks. When system utilization is below preset threshold U2, received blockchain blocks are distributed at an unrestricted rate without regard to parameters of the blockchain. When system utilization is above preset threshold U1, received blockchain blocks are temporarily stored locally on computer 10 until such time as system utilization falls below preset threshold U1. When system utilization is between preset thresholds U1 and U2, blockchain application may determine which blockchain blocks are distributed first based upon parameters of the data blockchain block such as blockchain block data size, blockchain block type, blockchain block metadata, blockchain block hashtags, the software application associated with the data object stored in the blockchain, a file priority identifier, or any other attribute associated with the blockchain block. For example, blockchain application 14 may have a preset rule where blockchain blocks are distributed in order of smallest to largest. Another preset rule may be based upon distributing blockchain blocks in order of the type of data object stored within them where blockchain blocks with spreadsheet documents are distributed first, then word processing documents, then media files. Another preset rule may be where blockchain blocks are distributed in order of the type of software application that created the data objects stored within them, such as blockchain blocks storing documents made by a word process are distributed first, then documents made by a database application are distributed next. Blockchain blocks may have a priority identifier associated with them where they are selected to be distributed based on a user or application identified order. For example, a user or application may flag certain blockchain blocks as having priority for distribution over other non-priority blockchain blocks. Blockchain blocks may be distributed according to an order specified by rules prioritizing certain metadata over other metadata. When system utilization is between preset thresholds U1 and U2, blockchain application may determine which blockchain blocks are distributed first based upon parameters of the blockchain, such as hash algorithm, type of blockchain, metadata about the blockchain, or another parameter. Step 6010 in which blockchain blocks 68, 70, and 72 are distributed onto distributed network 22 may be done as a background process. The process then ENDS with step 6012 when the blockchain blocks are stored on the distributed network 22.

While the invention has been shown and described with reference to a particular embodiment thereof, it will be understood to those skilled in the art, that various changes in form and details may be made therein without departing from the spirit and scope of the invention.

The invention claimed is:

1. A non-transitory computer medium containing instructions to regulate creation and distribution of blockchain blocks based upon system utilization, executable by a processor to cause the processor to perform operations comprising:

determining utilization of a computer resource;

creating a virtual blockchain block based on a data object responsive to determining that the utilization of the computer resource exceeds a first threshold, wherein the virtual blockchain block includes file metadata on the data object but does not include blockchain cryptographic information; and creating a real blockchain block based on the data object responsive to determining that the utilization of the computer resource does not exceed the first threshold.

2. The non-transitory computer medium of claim 1, wherein the virtual blockchain block is converted to the real blockchain block responsive to determining that the utilization of the computer resource drops below the first threshold.

3. The non-transitory computer medium of claim 1, wherein real blockchain blocks are created at a metered rate that does not cause the utilization of the computer resource to exceed the first threshold.

4. The non-transitory computer medium of claim 3, wherein the utilization of the computer resource is monitored in real time by a system utilization computer application, or is simulated based upon a numerical model of the utilization of the computer resource using artificial intelligence, or a formula that models the utilization of the computer resource.

5. The non-transitory computer medium of claim 1, wherein the real blockchain block is created according to a preset rule based on a data object parameter or a blockchain parameter.

6. The non-transitory computer medium of claim 5, wherein the data object parameter is a size of the data object, a type of data object, or data object metadata, wherein the blockchain parameter is a type of hash digest algorithm.

7. The non-transitory computer medium of claim 1, wherein real blockchain blocks are created at an unrestricted rate responsive to determining that the utilization of the computer resource is below a preset threshold, wherein real blockchain blocks are created at a metered rate responsive to determining that the utilization of the compute resource is above the preset threshold.

8. The non-transitory computer medium of claim 7, wherein the metered rate is determined based upon real time monitoring of the utilization of the computer resource, a numerical model of the utilization of the computer resource using artificial intelligence, or a formula that models the utilization of the computer resource.

9. The non-transitory computer medium of claim 1, wherein real blockchain blocks are distributed to nodes of a distributed network responsive to determining that system utilization of the computer resource is below a preset threshold, or wherein real blockchain blocks are distributed to nodes of the distributed network at a metered rate responsive to determining that the utilization of the computer resource is below the preset threshold, wherein real blockchain blocks are not distributed to nodes of the distributed network responsive to determining that the utilization of the computer resource is above the preset threshold.

10. The non-transitory computer medium of claim 1, wherein the blockchain cryptographic information is a blockchain hash digest, wherein the real blockchain block includes a blockchain hash digest.

11. The non-transitory computer medium of claim 1, wherein a selection of hash algorithm is made to maintain the utilization of the computer resource below a preset threshold before creation of the real blockchain block.

12. A non-transitory computer medium containing instructions to regulate creation and distribution of blockchain blocks based upon system utilization, executable by a processor to cause the processor to perform operations comprising:

creating a blockchain block based on a data object that includes blockchain hash digests responsive to determining that utilization of a system resource is below a preset threshold; and creating a virtual blockchain block based on the data object and that does not include blockchain hash digests responsive to determining that the utilization of the system resource is above the preset threshold.

13. The non-transitory computer medium of claim 12, wherein the system resource is a CPU, memory, or network bandwidth.

14. The non-transitory computer medium of claim 12, further comprising converting the virtual blockchain block to the blockchain block with blockchain hash digests responsive to determining that the utilization of the system resource falls below the preset threshold.

15. The non-transitory computer medium of claim 12, further comprising distributing the blockchain block onto nodes of a storage network responsive to determining that the utilization of the system resource is below the preset threshold, or distributing the blockchain block onto nodes of the storage network at a metered rate responsive to determining that the utilization of the system resource is below the preset threshold, wherein the blockchain block is not distributed onto nodes of the storage network responsive to determining that the utilization of the system resource exceeds the preset threshold.

16. The non-transitory computer medium of claim 12, wherein blockchain blocks are created at an unrestricted rate responsive to determining that the utilization of the system resource is below a second preset threshold, wherein blockchain blocks are created at a metered rate based upon a data object parameter or a blockchain parameter responsive to determining that the utilization of the system resource is below the preset threshold.

17. A non-transitory computer medium containing instructions to create and regulate distribution of blockchain blocks based upon system utilization, executable by a processor to cause the processor to perform operations comprising:

creating real blockchain blocks based on a data object that include blockchain hash digests responsive to determining that utilization of a system resource is below a preset threshold; and converting virtual blockchain blocks to real blockchain blocks responsive to determining that the utilization of the system resource transitions to being below the preset threshold, wherein the virtual blockchain blocks are created responsive to determining that the utilization of the system resource is above the preset threshold and are based on the data object and do not include blockchain hash digests.

18. The non-transitory computer medium of claim 17, wherein virtual blockchain blocks are created responsive to determining that the utilization of the system resource exceeds the preset threshold, wherein the system resource is a CPU, memory, or network bandwidth.

19. The non-transitory computer medium of claim 18, further comprising distributing the blockchain blocks onto nodes of a storage network responsive to determining that the utilization of the system resource is below the preset threshold, or distributing the blockchain blocks onto nodes of the storage network at a restricted rate responsive to determining that the utilization of the system resource is below the preset threshold, wherein the blockchain blocks are not distributed onto nodes of the storage network responsive to determining that the utilization of the system resource exceeds the preset threshold.

20. The non-transitory computer medium of claim 19, wherein the utilization of the system resource is monitored in real time by a utilization computer application, or is simulated based upon a numerical model of the utilization of the system resource using artificial intelligence, or a formula that models the utilization of the system resource.

\* \* \* \* \*